(12) United States Patent
Aratsu et al.

(10) Patent No.: US 10,380,245 B2
(45) Date of Patent: *Aug. 13, 2019

(54) VERIFYING THE TERMS OF USE FOR ACCESS TO A SERVICE

(71) Applicant: International Business Machines Corporation, Armonk, NY (US)

(72) Inventors: Taku Aratsu, Yokohama (JP); Daisuke Hayashi, Tokyo (JP); Tomohiro Shimizu, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 547 days.

This patent is subject to a terminal disclaimer.

(21) Appl. No.: 14/102,851

(22) Filed: Dec. 11, 2013

(65) Prior Publication Data

US 2014/0163967 A1 Jun. 12, 2014

(30) Foreign Application Priority Data

Dec. 11, 2012 (JP) ................... 2012-270215

(51) Int. Cl.
*G06F 17/27* (2006.01)
*G06F 17/20* (2006.01)
(Continued)

(52) U.S. Cl.
CPC ............ *G06F 17/277* (2013.01); *G06F 17/27* (2013.01); *G06F 21/60* (2013.01); *G06F 21/6209* (2013.01)

(58) Field of Classification Search
CPC . H04L 67/16; H04L 67/2852; G06F 17/2785; G06F 19/322; G06F 17/28;
(Continued)

(56) References Cited

U.S. PATENT DOCUMENTS 9,798,802 B2 * 10/2017 Levi .................. G06F 17/30719
2002/0188869 A1 * 12/2002 Patrick ................ G06F 21/6245
726/4

(Continued)

FOREIGN PATENT DOCUMENTS

JP 2004533075 A 10/2004
JP 2005316952 A 11/2005
(Continued)

OTHER PUBLICATIONS

"Terms of Services & Privacy Policies in Plain English", [online], [Search: Nov. 12, 2012]. Internet URL:http://www.tossos.com/.

(Continued)

*Primary Examiner* — Michael Ortiz-Sanchez
(74) *Attorney, Agent, or Firm* — Michael O'Keefe; Gregory K. Goshorn; Greg Goshorn, P.C.

(57) ABSTRACT

Provided are techniques in which a document accompanying a service is acquired, a natural language analysis is performed on the acquired document, a determination is made from the results of the natural language analysis whether an item defined in the access control policy is found in the acquired document and, when the item defined in the access control policy is found in the acquired document, the access control policy is referenced and access to the service controlled accordingly.

9 Claims, 20 Drawing Sheets

(51) Int. Cl.
*G06F 21/62* (2013.01)
*G06F 21/60* (2013.01)

(58) Field of Classification Search
CPC ............... G06F 17/30684; G06F 21/62; G06F 17/2211; G06F 21/00; G06F 21/55; G06F 21/6218; G06F 21/6227; G06F 21/6245; G06F 21/6263
See application file for complete search history.

(56) References Cited

U.S. PATENT DOCUMENTS

| | | | | |
|---|---|---|---|---|
| 2003/0014418 | A1* | 1/2003 | Adler | G06F 21/6245 |
| 2003/0014654 | A1* | 1/2003 | Adler | G06F 21/6254 |
| | | | | 726/6 |
| 2003/0131001 | A1* | 7/2003 | Matsuo | G06F 21/34 |
| 2005/0234859 | A1* | 10/2005 | Ebata | G06F 21/6218 |
| 2007/0118513 | A1* | 5/2007 | Iwasaki | G06Q 10/107 |
| 2009/0144255 | A1* | 6/2009 | Chow | G06F 21/6218 |
| 2009/0292930 | A1* | 11/2009 | Marano | G06F 21/6218 |
| | | | | 713/189 |
| 2012/0030187 | A1* | 2/2012 | Marano | G06F 21/6218 |
| | | | | 707/709 |
| 2012/0039326 | A1* | 2/2012 | Chia | H04L 63/04 |
| | | | | 370/342 |
| 2013/0042108 | A1* | 2/2013 | Cancedda | H04L 9/28 |
| | | | | 713/168 |
| 2013/0246932 | A1* | 9/2013 | Zaveri | G06F 3/017 |
| | | | | 715/740 |
| 2013/0297626 | A1* | 11/2013 | Levi | G06F 17/30707 |
| | | | | 707/754 |
| 2015/0142718 | A1* | 5/2015 | Bostick | G06N 5/025 |
| | | | | 706/47 |
| 2015/0326596 | A1* | 11/2015 | Zhang | G06F 21/62 |
| | | | | 726/1 |
| 2016/0125172 | A1* | 5/2016 | Fuller | G06F 21/105 |
| | | | | 726/26 |
| 2017/0193624 | A1* | 7/2017 | Tsai | G06Q 50/265 |

FOREIGN PATENT DOCUMENTS

| | | |
|---|---|---|
| JP | 2006227753 A | 8/2006 |
| JP | 2006318370 A | 11/2006 |
| JP | 2007140578 A | 6/2007 |
| JP | 2007226495 A | 9/2007 |
| JP | 2008500632 A | 1/2008 |
| JP | 2008191838 A | 8/2008 |
| JP | 2010015542 A | 1/2010 |
| JP | 2010015543 A | 1/2010 |
| JP | 2012178137 A | 9/2012 |

OTHER PUBLICATIONS

Terms of Service; Didn't Read, [online], [Search: Nov. 12, 2012]. Internet URL: http:// tos-dr.info/.
"The Standard Information Sharing Label", [online], [Search: Nov. 12, 2012].Internet URL.
"OASIS eXtensible Access Control Markup Language (XACML) TC", [online] [Search: Nov. 12, 2012].Internet URL: https://www.oasis-open.org/committees/tc_home.php?wg_abbrev=xacml.

* cited by examiner

Figure 12

| Annotation | | Attribute Name | Attribute Value |
|---|---|---|---|
| Subjects | 611 | Service Provider | The company |
| | | ... | ... |
| | | ... | ... |
| Resources | 612 | Personal Information | Personal Information of Users |
| | | | Birthday |
| | | | Photographs |
| | | | ... |
| | | ... | ... |
| Actions | 613 | Use in Advertising | Use in advertising |
| | | | ... |
| | | ... | ... |

| Annotation | Attribute Name | Attribute Value |
|---|---|---|
| Subjects | User | User |
|  | ... | ... |
|  |  | ... |
| Resources | Software | The software |
|  |  | The application |
|  |  | The installation disk |
|  | ... | ... |
|  |  | ... |
| Actions | Not for Commercial Use | Not for commercial use |
|  |  | ... |
|  | ... | ... |

Figure 14

| Target | Subjects | System Provider |
| --- | --- | --- |
| | Resources | Personal Information |
| | Actions | Use in advertising |
| Effect | | Display warning |
| Condition | | The user, after ending use during registration of the service... |

| | | 721 |
|---|---|---|
| Target 731 | Subjects | User |
| | Resources | Software |
| | Actions | Not for commercial use |
| Effect 732 | | Stop installation |
| Condition 733 | | The user, when starting installation of the software... |

| Target | Subjects | * (Any software) |
|---|---|---|
| | Resources | Address book |
| | Actions | Read/Write |
| Effect | | Access prohibited |
| Condition | | Establish priority 2 for software "A" |

751
752
753

761

| Target | Subjects | Software |
|---|---|---|
| | Resources | Address book |
| | Actions | Use in email delivery |
| Effect | | Access permitted |
| Condition | | Establish priority 1 for software "A" |

771
772
773

VERIFYING THE TERMS OF USE FOR ACCESS TO A SERVICE

FIELD OF DISCLOSURE

The claimed subject matter relates generally to techniques for service verification and, more specifically, to techniques for controlling access to a service.

SUMMARY

When starting use of a web service or installing software on a electronic device, users are typically presented with Terms of Use or Privacy Policies and License Agreements. In order to use a web service or install software, the use clicks on a button indicating to indicate the user accepts or agrees, often without sufficient understanding of the Terms of Use, Privacy Policy or License Agreement. There are also web services that are available to users without registration.

Terms of Use, Privacy Policy and License Agreements often state conditions and terms that are inconvenient or disadvantageous to users. For example, Terms of Use, Privacy Policy and License Agreements often state that the service provider is allowed to access personal information or data and store personal information not directly related to the web service or installed software, that the service provider is allowed to automatically charge additional fees or automatically extend the service period.

In some cases, web services are used and software installed without regard to limitations on use imposed by organizations, countries and companies, and without the user being aware of these restrictions as stated in the Terms of Use, Privacy Policy and License Agreements. Also, when a foreign web service is used or software installed that has not been localized into the user's native language, the user may have difficulty understanding Terms of Use, Privacy Policy and licensee Agreements that are not written in the user's native language. In addition, with the proliferation of tablets and smart phones, children can more easily use web services. Children nearly always click on an accept or agree button without reading the Terms of Use or Privacy Policy or without understanding the Terms of Use or Privacy Policy. This may lead to very large bills.

BRIEF DESCRIPTION OF THE DRAWINGS

FIG. 12 shows an example of an annotation dictionary that may be used by the computer (natural language analysis mechanism) to perform the annotation in accordance with an embodiment of the claimed subject matter.

FIG. 13 shows an example of an annotation dictionary that may be used by the computer (natural language analysis mechanism) to perform the annotation in accordance with an embodiment of the claimed subject matter.

FIG. 14 shows an example of an access control policy that may be used by the computer in accordance with an embodiment of the claimed subject matter.

FIG. 15 shows an example of an access control policy that may be used by the computer in accordance with an embodiment of the claimed subject matter.

FIG. 16 shows an example of an access control policy that may be used by the computer in accordance with an embodiment of the claimed subject matter.

DETAILED DESCRIPTION

Figure 1:
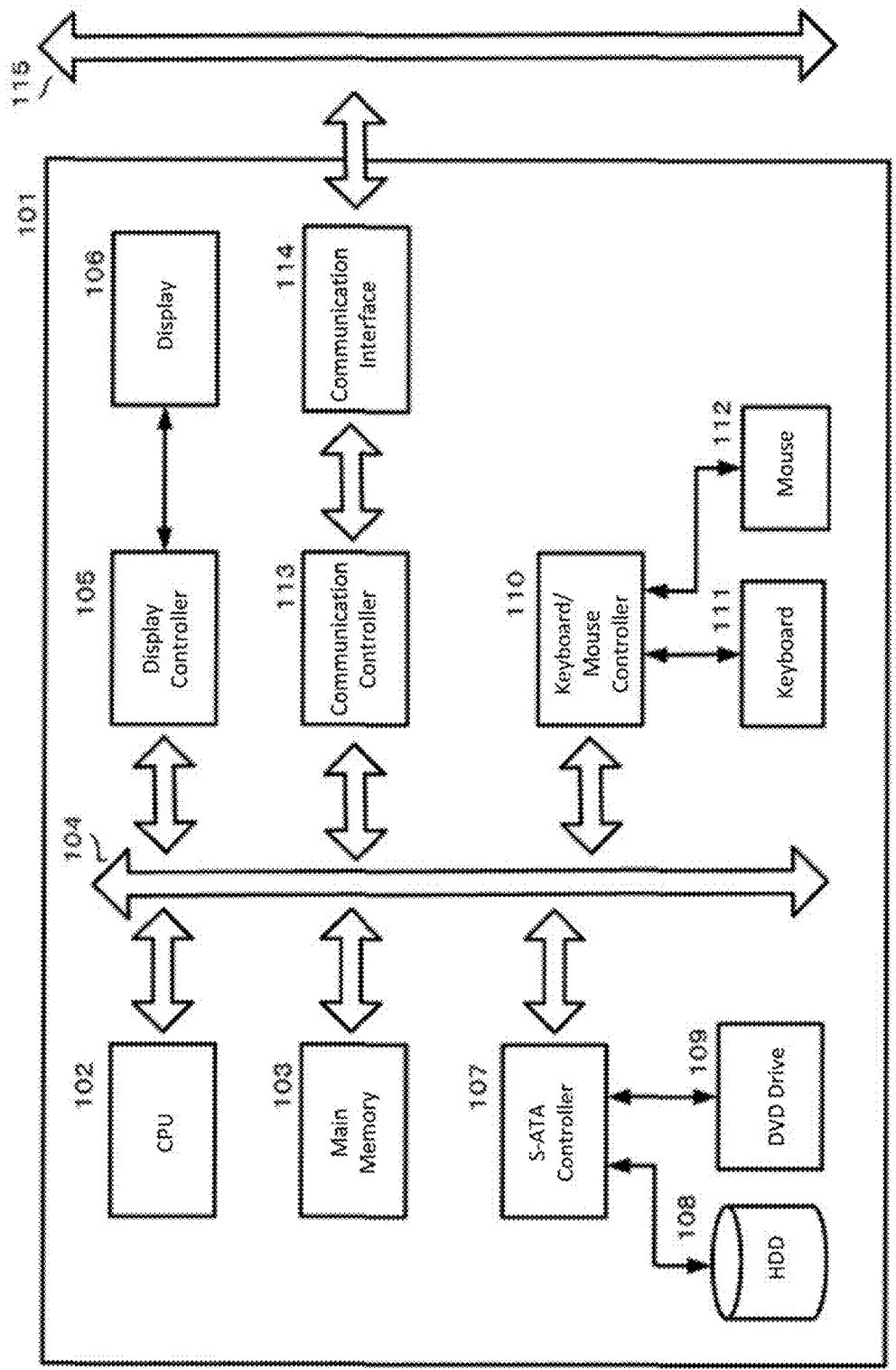
FIG. 1 is a diagram showing an example of a hardware configuration used to embody the computer for controlling access to a service according to an embodiment of the claimed subject matter.

An object of the claimed subject matter is to control access to a service based on a user policy in a document accompanying the service. Another object of the claimed subject matter is to control access to a service from the perspective of protecting personal information. More specifically, it is an object of the claimed subject matter to control access to a service associated with a document which states, for example, that the service provider will not access personal information not directly related to a web service or installed software but that the service provider is allowed to collect personal information.

Another object of the claimed subject matter is to control access to a service from the perspective of corporate compliance. More specifically, it is an object of the claimed subject matter to control access to a service associated with a document stating that use of the service is limited by the terms of the organization.

Another object of the claimed subject matter is to control access to a service from the perspective of security. More specifically, it is an object of the claimed subject matter to control access to a service associated with a document stating, for example, that additional automatic billing or automatic extension of the service period is allowed. More specifically, it is also an object of the claimed subject matter to prevent unlimited access, for example, by children to the service associated with the document.

The claimed subject matter provides techniques in which a document accompanying a service is acquired, a natural language analysis is performed on the acquired document, a determination is made from the results of the natural language analysis whether an item defined in the access control policy is found in the acquired document and, when the item defined in the access control policy is found in the acquired document, the access control policy is referenced and access to the service controlled accordingly. Techniques may include a method, computer, computer program, and computer program product for controlling access to a service.

The claimed subject matter is the method mentioned above in which a computer executing performs acquiring a document accompanying the service; performing natural language analysis on the acquired document; determining from the results of the natural language analysis whether or not an item defined in an access control policy is in the acquired document; and referencing the access control policy and controlling access to the service in response to an item defined in the access control policy being found in the document.

The claimed subject matter is also the computer mentioned above in which the computer includes: an acquiring means for acquiring a document accompanying the service; an analyzing means for performing natural language analysis on the acquired document; a determining means for determining from the results of the natural language analysis whether or not an item defined in an access control policy is in the acquired document; and a control means for referencing the access control policy and controlling access to the service in response to an item defined in the access control policy being found in the document.

In one aspect of the claimed subject matter, the analyzing means may include an annotating means for adding a subject, resource or action annotation to a term in response to the results of natural language analysis having a term associated with the access control policy.

In one aspect of the claimed subject matter, the determining means may match a term having a predetermined relationship to an item defined in the access control policy in response to at least two terms with a subject, resource or action annotation having the predetermined relationship.

In one aspect of the claimed subject matter, the control means may control access in accordance with access control details defined in the access control policy.

In one aspect of the claimed subject matter, the control means prohibit some or all access to the service in accordance with access control details defined in the access control policy.

In one aspect of the claimed subject matter, the control means may control access in accordance with an access control policy application priority defined in the access control policy.

In one aspect of the claimed subject matter, the control means may control access in accordance with a time period defined in the access control policy.

In one aspect of the claimed subject matter, the control means may force the user receiving the service to choose whether or not to use the service.

In one aspect of the claimed subject matter, the computer may include a receiving means for receiving a start request for the service. In one aspect of the claimed subject matter, the receiving means may acquire the document in response to receiving a start request.

In one aspect of the claimed subject matter, the computer may include a retrieval means for retrieving a document accompanying the service.

In one aspect of the claimed subject matter, the retrieval means may execute at least one task including: asking the user to input the document accompanying the service in response to the document not being found; choosing whether or not to allow the user receiving the service to use the service; and indicating that the document could not be found.

The claimed subject matter also provides a computer program and computer program product for executing in a computer each block of a method in accordance with an embodiment of the claimed subject matter.

A computer program for executing functions to control access to a service according to the present embodiment can be stored on any computer-readable recording medium, including a flexible disk, MO, CD-ROM, DVD, BD, hard disk device, USB memory, ROM, MRAM or RAM. The computer program can also be downloaded from another data processing system connected to a communication network for storage on a recording medium, or can be copied from another recording medium. The program can also be compressed, divided into a plurality of programs, and recorded on one or more recording media. A computer program product embodying the claimed subject matter can take a variety of forms. The computer program product can include, for example, the recording medium on which the computer program is stored or a transmission medium over which the computer program is transmitted.

The summary of the claimed subject matter provided above is not intended to enumerate all of the required features of the claimed subject matter, and it is to be understood that the claimed subject matter includes all combinations and sub-combinations of these constituent elements.

It should also be clear that a person of skill in the art could conceive of various changes such as combining a plurality of machines and allocating functions to these machines to embody the hardware configurational elements of the information processing device used in the embodiment of the claimed subject matter. These changes are encompassed within the concept of the claimed subject matter. However, these configurational elements are for illustrative purposes only, and all of the configurational elements are not essential configurational elements of the claimed subject matter.

Also, the claimed subject matter can be realized by hardware, software, or a combination of hardware and software. When the claimed subject matter is executed by a combination of hardware and software, it is typically executed by a device in which the computer program has been installed. Here, the computer program is downloaded to the memory of the device and executed. The computer program then controls the device and executes the processing of the claimed subject matter. This computer program can be configured from groups of instructions expressed in any language, code or notation. The device can execute the specific functions in the group of instructions immediately, or after (1) converting the group of instructions into another language, code or notation, and/or (2) copying the group of instructions to another medium.

In an aspect of the claimed subject matter, a computer can acquire a document accompanying a web service, analyze the acquired document, and control access to the web service on the basis of an access control policy when a user, for example, opens a web page or registers to use the web service. Controlling access to the web service in this way is advantageous from the perspectives of protecting personal information, ensuring compliance at a corporation or governmental organization, and providing security.

In another aspect of the claimed subject matter, a computer can acquire a document accompanying software, analyze the acquired document, and control access to the installation of the software on the basis of an access control policy when a user, for example, installs the software. Controlling access to installation in this way is advantageous from the perspectives of providing security, ensuring compliance at a corporation or governmental organization, and protecting personal information.

The following is an explanation of an embodiment of the claimed subject matter with reference to the drawings. Identical elements are denoted by the same reference symbols in all of the drawings unless otherwise indicated. The following is an explanation of a preferred embodiment of the claimed subject matter, and it should be understood that there is no intention to limit the scope of the claimed subject matter to what is described herein.

FIG. 1 is a diagram showing an example of a hardware configuration used to embody the computer for controlling access to a service according to an embodiment of the claimed subject matter. This computer (101) includes a central processing unit (CPU) (102) and a main memory (103), and these are connected to a bus (104). The CPU (102) is preferably based on a 32-bit or 64-bit architecture. Examples that can be used include the Power (trademark) series from International Business Machines Incorporated, the Core i (trademark) series, Core 2 (trademark) series, Atom (trademark) series, Xeon (trademark) series, Pentium (registered trademark) series or Celeron (registered trademark) series from Intel Corporation, the A series, Phenom (trademark) series, Athlon (trademark) series, Turion (trademark) series, or Sempron (trademark) from Advanced Micro Devices, and the A series from Apple Computer (registered trademark). A display (106) such as a liquid crystal display (LCD) may be connected to the bus (104) via a display controller (105). The display (106) may be used to control the computer and to display on an appropriate graphic interface information from a computer connected to the network via a communication line and information related to the software running on the computer. A disk (108), such as a silicon disk or hard disk, may be connected to the bus (104) via a SATA or IDE controller (107). A drive such as a CD, DVD or BD drive, may also be connected to the bus (104) via a SATA or IDE controller (107). A keyboard (111) and mouse (112) may be optionally connected to the bus (104) via a keyboard/mouse controller (110) or USB bus (not shown), but this is not necessary to the embodiment of the claimed subject matter.

An operating system such as Windows (registered trademark), UNIX (registered trademark). MacOS (registered trademark) or Smart Phone OS (registered trademark), a Java (registered trademark) processing environment such as J2EE, Java (registered trademark) applications, Java (registered trademark) virtual machines (VM), and Java (registered trademark) just-in-time (JIT) compilers, as well as other programs and data, may be stored on the disk (108) for download to the main memory (103).

If necessary, a drive (109) may be used to install a program such as an operating system or application on the disk (108) from a CD-ROM, DVD-ROM or BD.

The communication interface (114) can use, for example, an Ethernet (registered trademark) protocol. The communication interface (114) is connected to a bus (104) via a communication controller (113), and functions to physically connect the computer (101) to the communication network (115). This provides a network interface layer for the TCP/IP communication protocol in the communication function of the operating system of the computer (101). The communication line can operate in wired LAN environment or a wireless LAN environment based, for example, on a wireless LAN standard such as IEEE 802.11a, b, g, n, i, j, ac, ad, or on Long-Term Evolution (LTE).

There are no particular restrictions on the computer. Examples include personal computers such as desktop computers and notebook computers, servers, cloud-utilizing terminals, tablets, smart phones, mobile phones, and personal digital assistants.

Figure 2:
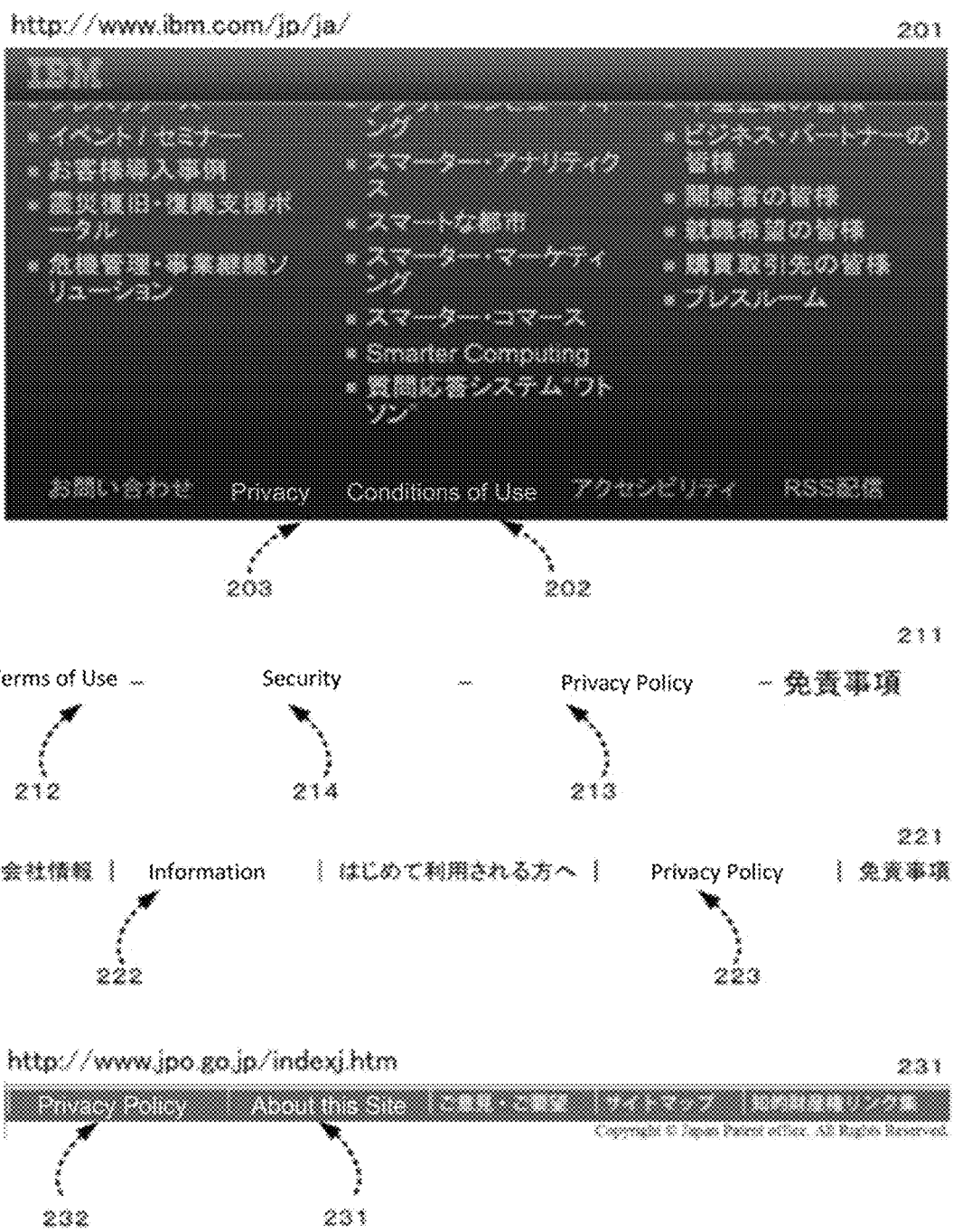
FIG. 2 shows an example according to an embodiment of the claimed subject matter in which the service used in the computer shown in FIG. 1 is a web service, and the document accompanying this service is Terms of Use, Conditions of Use, Information, Privacy or Privacy Policy.
Figure 3:
FIG. 3 shows an example according to an embodiment of the claimed subject matter in which the service used in the computer shown in FIG. 1 is a web service, and the document accompanying this service is Terms of Use, Conditions of Use, Privacy or Privacy Notice.
Figure 3:
Figure 3:
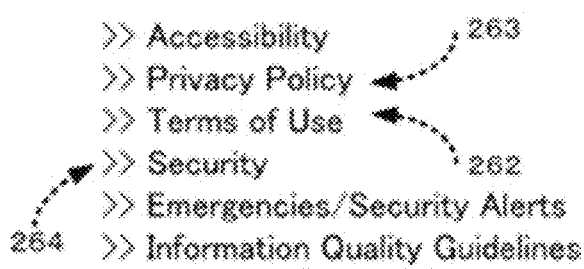
Figure 4:
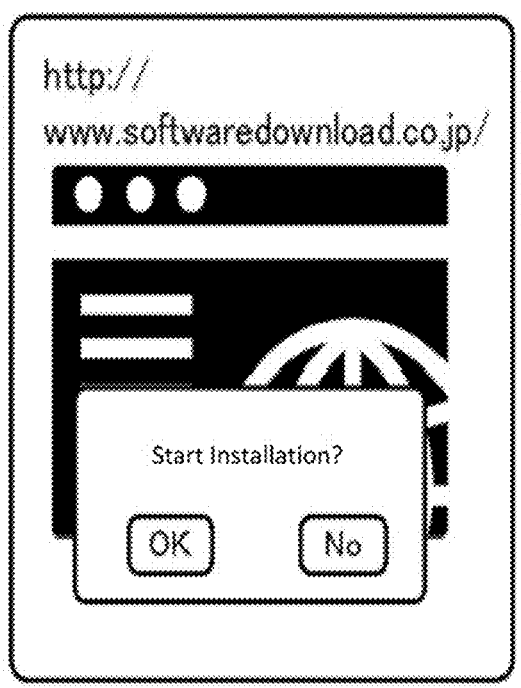
FIG. 4 shows an example according to an embodiment of the claimed subject matter in which the service used in the computer shown in FIG. 1 is software installation, and the document accompanying this service is a License Agreement.
Figure 4:
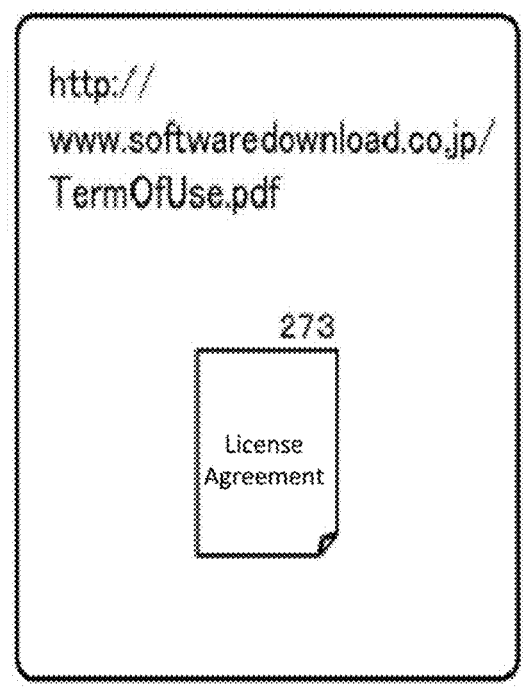
Figure 4:
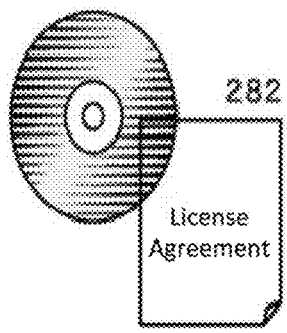

FIG. 2 through FIG. 4 show examples of services used by the computer in FIG. 1 in accordance with an embodiment of the claimed subject matter, and the documents accompanying these services. In the embodiment of the claimed subject matter, "service" refers to a service that is accessible from a computer. Services that are accessible from a computer include network services that are accessible from a computer or non-network services that are accessible from a computer. Network services accessible from a computer include, but are not limited to, the following:

Web services accessible from a computer: various types of services available on the web, such as Google (registered trademark) web APIs, Amazon (registered trademark) web services, and social networking services (SNS);

Services connecting a computer to various types of networks: wired or wireless services connecting a computer to various types of institutions (for example, airports, stations, trains, express trains, restaurants or hotels);

Services for downloading content to a computer: services downloading various types of data, including software, documents, photographs, videos, music or movies uploaded to the internet;

Services for uploading content from a computer: services for uploading various types of data, including software, documents, photographs, videos, music or movies to the internet, such as cloud storage (Dropbox, etc.); or Services for installing software downloaded or available for download to a computer: services for installing software downloaded from the internet on a computer, or services for installing automatically updated programs or files for software downloaded from the internet on a computer.

Non-network services accessible from a computer include, but are not limited to, the following:

Services for installing software on a computer: services able to install software (such as an operating system or application software) on a computer from various types of media (CD-ROM, DVD-ROM, or memory media such as USB memory, etc.) or from a wired or wireless network (IEEE 802.11a, b, g, n, i, j, ac, ad, WiFi, or LTE);

Application development environment or execution environment services on a computer: services such as .NET Framework from Microsoft Corporation (registered trademark); or Services for initializing a computer: services for initializing a new computer or services for setting a new computer in accordance with in-house compliance.

Network services and non-network services accessible from a computer do not have to be strictly separated, and a service according to an embodiment of the claimed subject matter can be categorized as both. These services may also include those that a user can enjoy or receive with or without reading a document accompanying the service (including those in which the user scrolls through some or all of a document in a perfunctory manner).

Documents accompanying services are documents accompanying the provision of a service, such as documents created for provision of the surface from the standpoint of protecting personal information, ensuring compliance with a corporate or governmental organization, or providing security. The document may be electronic data or an electronic file in HTML, PDF, text format or Word format. A document accompanying service may be a document accompanying a network service accessible from a computer or a non-network service accessible by a computer.

A document accompanying a network service accessible from a computer include documents with the following titles: [in Japanese] Terms of Use, Conditions of Use, Terms & Conditions. Service Agreements, Guidelines for Use, Information, Privacy, Privacy Policy, Handling of Privacy, Security, Handling of Security, [in English] Terms of Use, Conditions of Use, Terms & Conditions, Readme, Privacy, Privacy Policy, Privacy Notice, and Security. However, these documents are not limited to these titles.

A document accompanying a non-network service accessible from a computer include documents with the following titles: [in Japanese] End User Licenses, License Agreements, [in English] End User License, and License Agreements. However, these documents are not limited to these titles.

Documents accompanying a service can be retrieved via a computer search, or provided or offered to the user of a service.

FIG. 2 shows examples of web services (Japanese-language sites) that may be used in an embodiment of the claimed subject matter and examples of documents accompanying these services. In the example of web service (201), the documents accompanying the web service are electronic data linked to the titles Conditions of Use (202) and Privacy (203).

In the example of web service (211), the documents accompanying the web service are electronic data linked to the titles Conditions of Use (212), Privacy Policy (213), and Security (214). In the example of web service (221), the documents accompanying the web service are electronic data linked to the titles Information (222) and Privacy Policy (223). In the example of web service (231), the documents accompanying the web service are electronic data linked to the titles Privacy Policy (232) and About This Site (231).

FIG. 3 shows examples of web services (English-language sites) that may be used in an embodiment of the claimed subject matter and examples of documents accompanying these services. In the example of web service (241), the documents accompanying the web service are electronic data linked to the titles Terms of Use (242) and Privacy (243). In the example of web service (251), the documents accompanying the web service are electronic data linked to the titles Conditions of Use (252) and Privacy Notice (253). In the example of web service (261), the documents accompanying the web service are electronic data linked to the titles Terms of Use (262), Privacy Policy (263) and Security (264).

FIG. 4 shows examples of software-installing services that may be used in an embodiment of the claimed subject matter and examples of documents accompanying these services. In the example of the service for installing software downloadable from the web (271) on a computer, the document accompanying the service may be an electronic data file (273) of a License Agreement downloadable from a different URL (272) on the web (271). In the example of the service for installing software downloadable from a DVD-ROM (281) on a computer, the document accompanying the service may be an electronic data file (282) of a License Agreement stored on the DVD-ROM (281).

Figure 5:
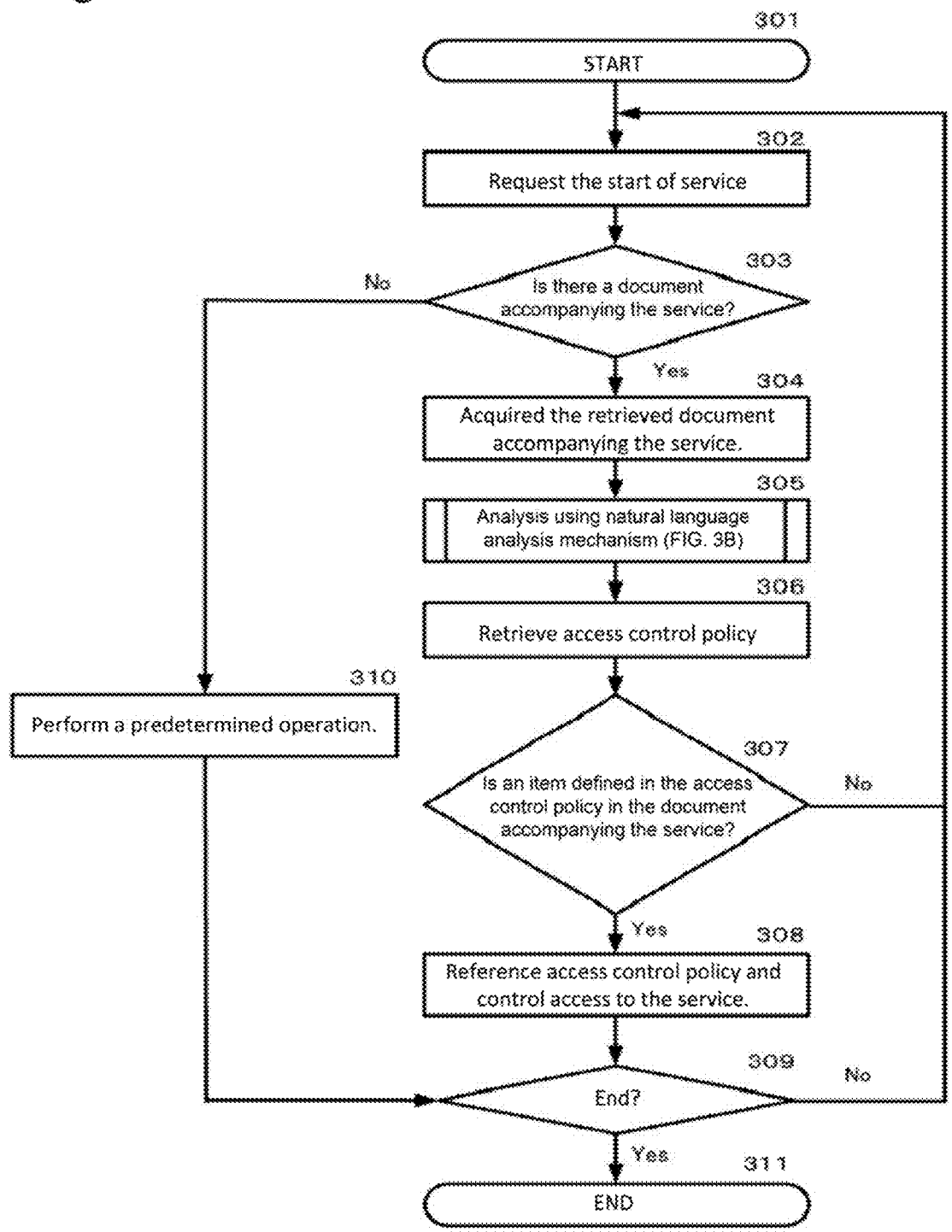
FIG. 5 is a flowchart used to control access to a service in accordance with an embodiment of the claimed subject matter.
Figure 6:
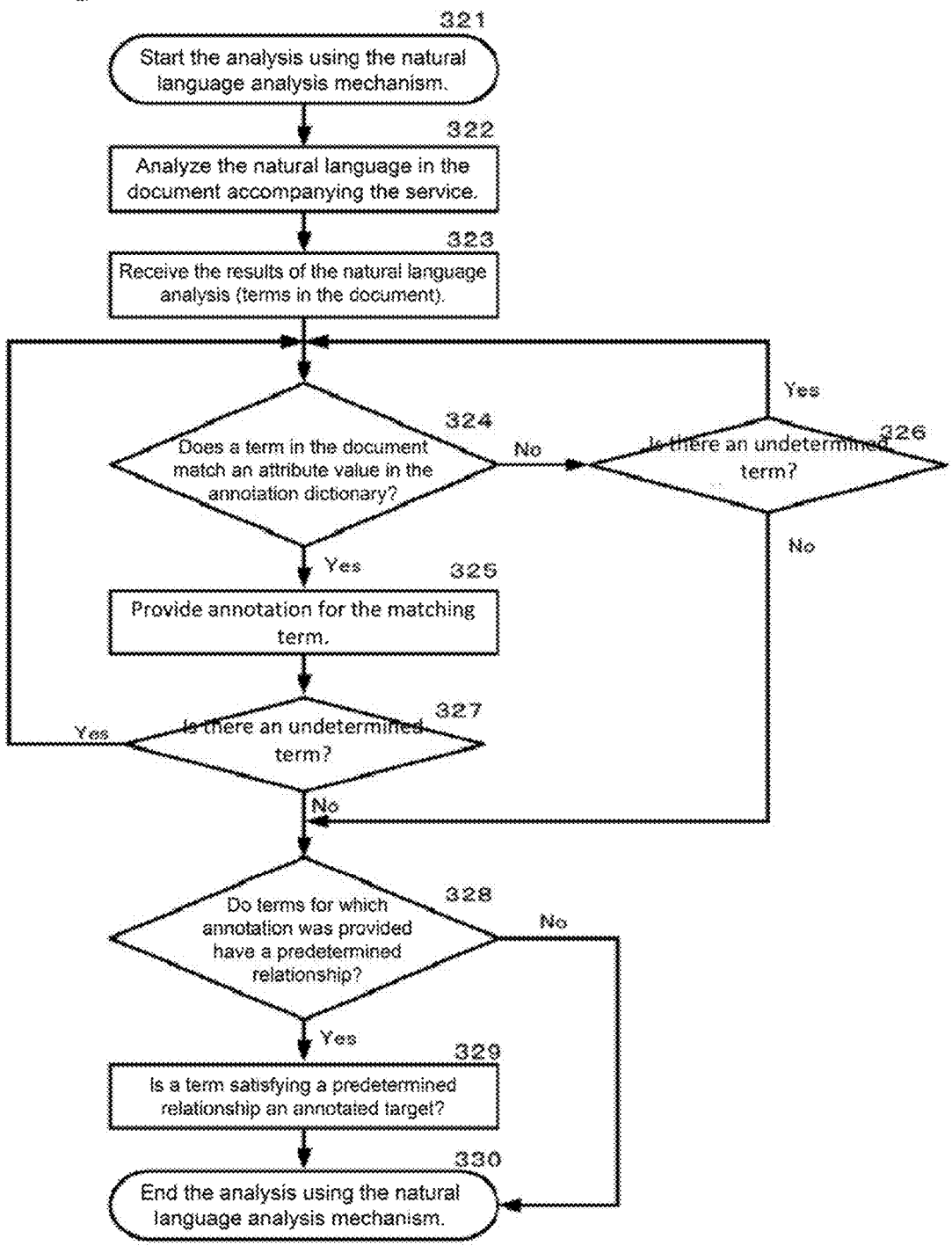
FIG. 6 is a flowchart of the natural language analysis performed by the natural language analysis mechanism in the flowchart shown in FIG. 5.
Figure 17:
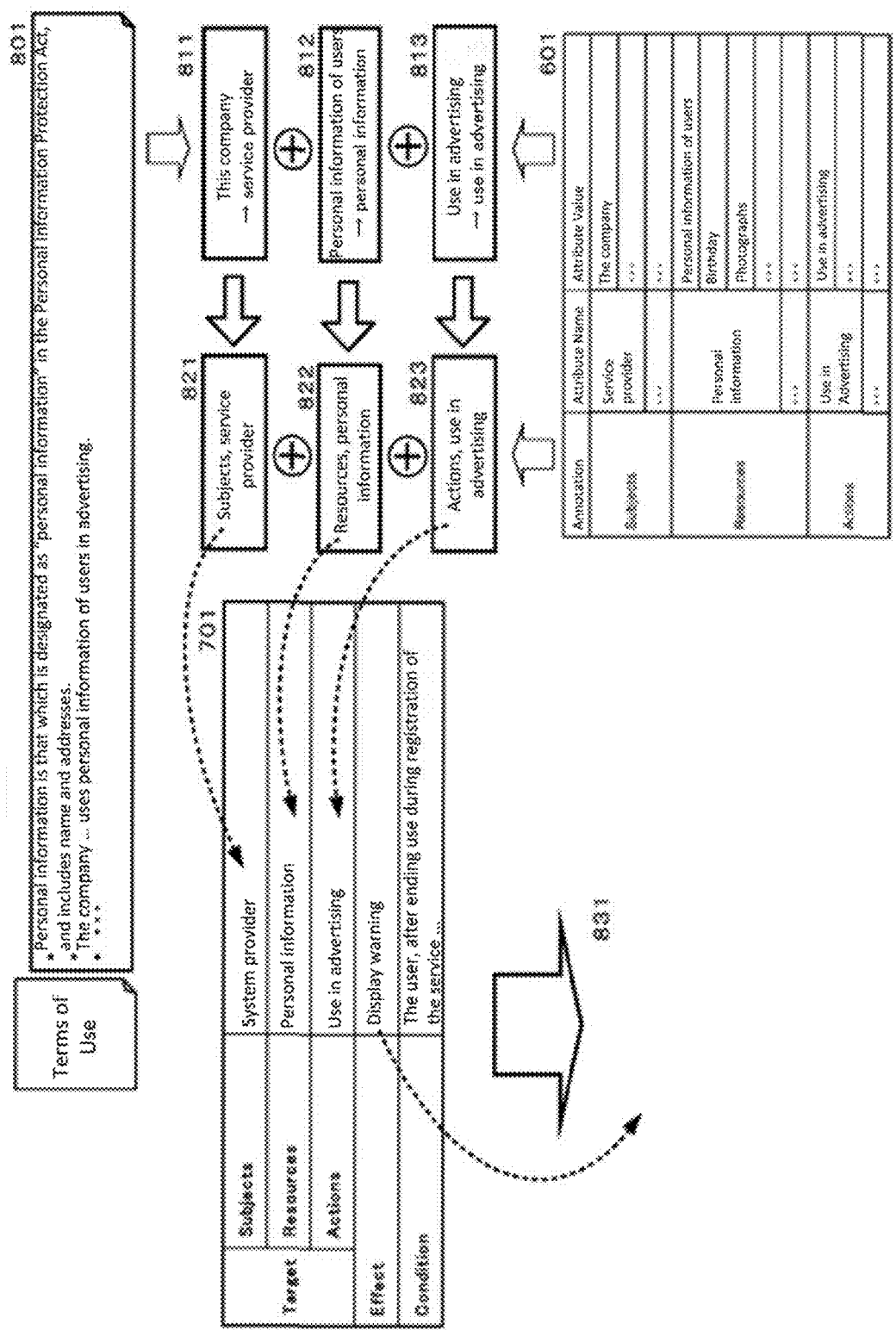
FIG. 17 shows an example in which a computer references an access control policy and controls access to a service (web service) in accordance with an embodiment of the claimed subject matter.
Figure 18:
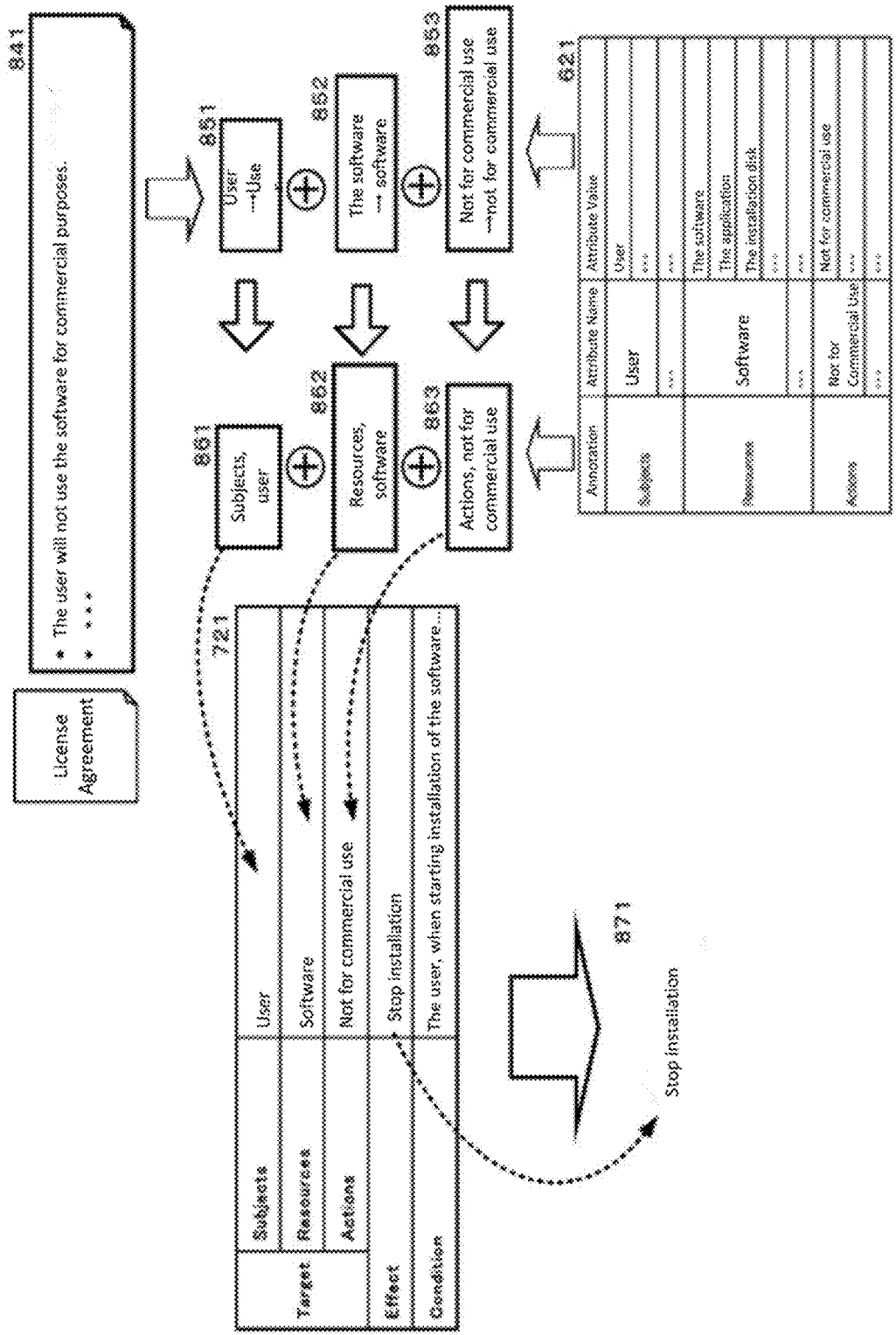
FIG. 18 shows an example in which a computer references an access control policy and controls access to a service (software installation) in accordance with an embodiment of the claimed subject matter.

FIG. 5 and FIG. 6 show a flowchart for controlling access to a service in accordance with an embodiment of the claimed subject matter, and FIG. 7 through FIG. 15 are specific examples of each block shown in FIG. 5 and FIG. 6. FIG. 17 through FIG. 18 are specific examples of access to a service being controlled in accordance with an embodiment of the claimed subject matter.

FIG. 5 and FIG. 6 show a flowchart for controlling access to a service in accordance with an embodiment of the claimed subject matter. In the following explanation of embodiments of the claimed subject matter, the service is a web service or a service that installs software. However, services that may be used in an embodiment of the claimed subject matter are not limited to web services and software installation.

In Block 301, the computer (101) starts the process of controlling access to a site in accordance with an embodiment of the claimed subject matter. In Block 302, the computer (101) receives a service start request (or start command).

If a Web Service

Figure 7:
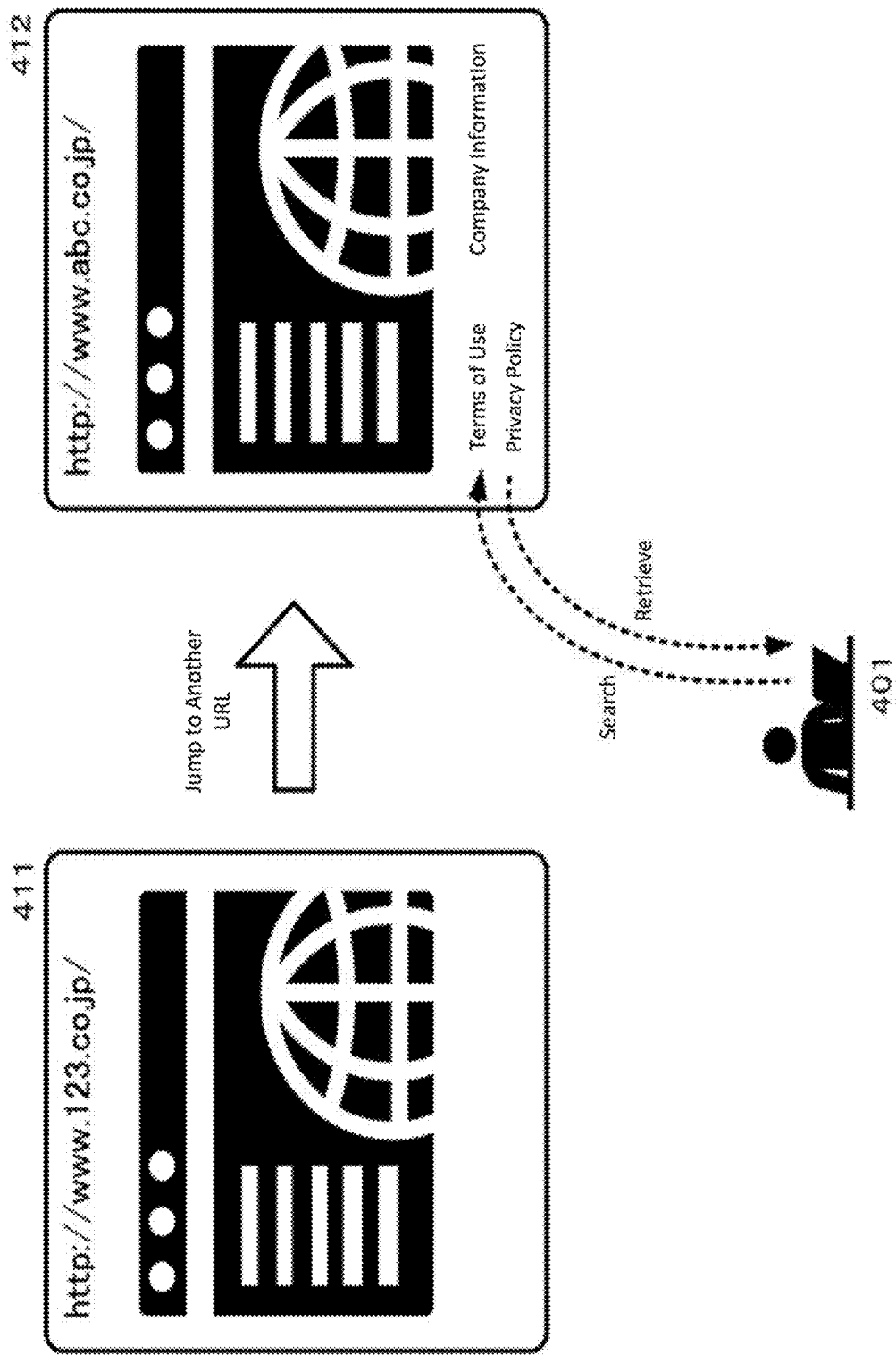
FIG. 7 shows an example of a document accompanying a service (web service) being sought and acquired in accordance with an embodiment of the claimed subject matter.
Figure 19:
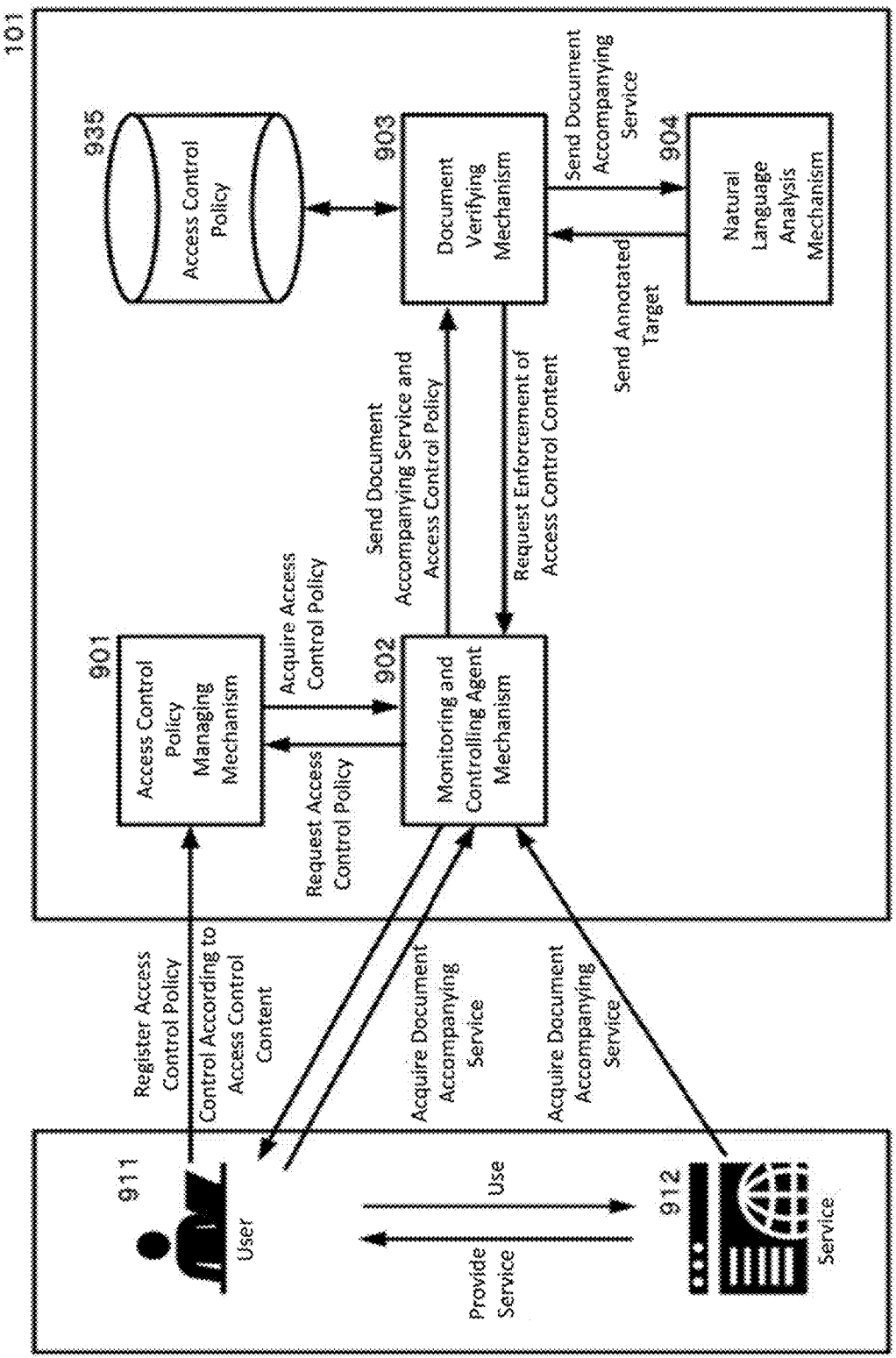
FIG. 19 is a function block diagram of a computer preferably including the hardware configuration of the computer in FIG. 1 which is used to control access to a service in accordance with an embodiment of the claimed subject matter.

The computer (101) can receive a start request for a web service in one of the following cases:

the user enters a particular URL into a web browser or clicks on a particular link (see FIG. 7);

the user enters a particular URL or clicks on a particular link to register with a web service;

the user begins entering information requested to start using a web service as part of the registration process for the web service;

the web browser displays the contents of a particular URL;

the web browser displays a document with a title such as Terms and Conditions;

the computer (101) receives notification that a web service start request has been received from the web browser; or the computer (101) receives notification that a web service start request has been received from the monitoring and control agent (901) shown in FIG. 19.

If a Software Installation Service

The computer (101) can receive a start request for software installation in one of the following cases:

the user enters a particular URL or clicks on a predetermined link in a web browser to download software to be installed;

the computer (101) receives notification from the web browser that downloading of a software installation file has started;

the user inserts a storage medium (CD-ROM or DVD-ROM) storing the software to be installed into a drive (109);

the user connects a memory device (such as USB memory) storing the software to be installed to a USB port;

the user clicks on the installation file for the software to be installed;

the computer (101) starts the authentication process for installed software; or the computer (101) receives notification that a software installation start request has been received from the monitoring and control agent (901) shown in FIG. 19.

In Block 303, the computer (101) searches for a document accompanying the service.

If a Web Service

The computer (101) searches for a document accompanying the web service at the same location (directory) as the entered URL or clicked link, or at a location (link) other than the entered URL or clicked link. The computer (101) may search each location by checking for a document with any one of the titles mentioned above. If a document accompanying the service has been found at a search location, the computer (101) advances the process to Block 304. If a document accompanying the service has not been found at a search location, the computer (101) advances the process to Block 310.

If a Software Installation Service

When software to be installed has been downloaded via the internet, the computer (101) searches for a document accompanying the installation of the software at the same location (directory) as the entered URL or clicked link, or at a location (link) other than the entered URL or clicked link. When the software to be installed is to be installed from a storage medium (CD-ROM, DVD-ROM or other memory device), the computer (101) searches for a document accompanying the installation of the software inside the medium or, if necessary, at a particular link in a file stored in the medium. The computer (101) may search each location by checking for a document with any one of the titles mentioned above. If a document accompanying the software installation has been found at a search location, the computer (101) advances the process to Block 304. If a document accompanying the service has not been found at a search location, the computer (101) advances the process to Block 310.

In Block 304, the computer (101) may download or copy any document accompanying the service that has been found at the search location, and store the copy in the memory (103) or a storage device (108) of the computer (101). In Block 305, the computer (101) performs natural language analysis on the downloaded or copied document. The natural language analysis will be explained below in greater detail with reference to FIG. 6. In Block 321, the computer (101) starts the natural language analysis. The computer (101) may perform the natural language analysis using a natural language analysis mechanism (see in FIG. 19 and FIG. 20) in the computer (101) itself, or in another computer 904 accessible by the computer (101). In the explanation of each block in FIG. 6 below, the natural language analysis mechanism (904) performs each block. However, each block can also be performed by another computer.

In Block 322, the natural language analysis mechanism (904) performs natural language analysis on the document accompanying the service sought and obtained in Block 304. The natural language analysis mechanism (904) may use any technique common in the art in the natural language analysis (see FIG. 19 below).

In Block 323, the natural language analysis mechanism (904) receives the results of the natural language analysis. The results of the natural language analysis include terms from the document (see 511 through 513 in FIG. 10 below and 551 through 553 in FIG. 11 below), and any dependencies of these terms in the document.

If Block 324, the natural language analysis mechanism (904) receives the results of the natural language analysis (that is, terms from the document), and determines whether a term from the document matches an attribute value in an annotation dictionary (see FIG. 12 and FIG. 13 below).

In the embodiment of the claimed subject matter, the annotation dictionary is a dictionary used to determine whether or not an item defined in an access control policy (see FIG. 14 through FIG. 16 below) is found in a document accompanying the service (that is, in the results of the natural language analysis).

The annotation dictionary at least includes annotations and attribute values. An annotation is a note (or identifier) attached to the results of the natural language analysis (that is, to terms in the document). In the embodiment of the claimed subject matter, the annotation dictionary includes, as annotations, Subjects, Resources and Actions. Subjects may include the actor providing the service (service provider), the actor using the service (the service user) or the service itself. Resources may include resources to be protector or resources related to the service. Actions may include actions performed by the service provider or service user, or actions performed by the service itself. Attribute values are expressions (one or more words) actually used in the document accompanying the service. The annotation dictionary associates a single annotation with a plurality of attribute values.

The annotation dictionary may also include attribute names. Attribute names are expressions that generalize or more broadly conceptualize attribute values. Thus, a single attribute name is associated with a plurality of attribute values. Because attribute names are used as items in an access control policy (see FIG. 14 through FIG. 16 below), they may be prepared for use in determining whether or not items defined in the access control policy are included in the document associated with the service.

The natural language analysis mechanism (904) advances the process to Block 325 when a term in the document matches an attribute value in the annotation dictionary. The natural language analysis mechanism (904) advances the process to Block 326 when none of the terms in the document match an attribute value in the annotation dictionary.

In Block 325, the natural language analysis mechanism (904) assigns an annotation associated with the attribute value matching the word, such as Subjects, Resources or Actions in response to a term in the document accompanying the service matching the attribute value in the annotation dictionary. Naturally, no term is annotated when there is no match.

In Block 326, the natural language analysis mechanism (904) determines whether or not there is an undetermined term in Block 324 among the terms in the document received in Block 323 in response to the term in the document accompanying the service not matching an attribute value in the annotation dictionary. When there is an undetermined term, the natural language analysis mechanism (904) returns to Block 324. When there are no undetermined terms, the natural language analysis mechanism (904) advances the process to Block 328.

In Block 327, the natural language analysis mechanism (904) determines whether or not there are any terms that have not been processed in Block 324 among the terms in the document received in Block 323. When there is an undetermined term, the natural language analysis mechanism (904) returns the process to Block 324. When there are no undetermined terms, the natural language analysis mechanism (904) advances the process to Block 328.

In Block 328, the natural language analysis mechanism (904) determines whether or not there is a predetermined relationship between terms that were annotated in Block 325. More specifically, the natural language analysis mechanism (904) determines whether or not at least two terms annotated with Subjects. Resources or Actions have a predetermined relationship. The predetermined relationships can be the following. At least two terms annotated with Subject, Resource or Action are included in the same item of the document accompanying the service. The same item in the document accompanying the service may be a predetermined unit of the document (such as a clause or section). The two annotations among Subjects, Resources and Actions can be two resources or actions but not two subjects. When there is no subject or the subject is unclear, the subject can be ignored.

At least one term annotated with Subject or one term annotated with Resource is linked to a term annotated with Action in any sentence of the document accompanying the service.

In Block 329, the natural language analysis mechanism (904) groups the terms with a predetermined relationship (the same attribute value in the annotation dictionary) as annotated targets (annotated Targets below). Alternatively, the natural language analysis mechanism (904) groups the attribute names associated with terms having a predetermined relationship (the same attribute value in the annotation dictionary) as annotated targets. The reason that attribute names are grouped as annotated targets in the latter case is that, when items defined in an access control policy are specified by attribute name, the computer (101) can more easily determine whether or not an item defined in an access control policy is found in an annotated target than when attribute values are grouped into annotated targets.

In Block 330, the natural language analysis mechanism (904) ends the natural language analysis, and advances the process to Block 306 in FIG. 5.

In Block 306, the computer (101) reads one or more access control policies (see FIG. 14 through FIG. 16 below). In the embodiment of the claimed subject matter, the access control policy has Targets, Effects and Conditions.

Targets in the access control policy are specific combinations of Subjects, Resources and Actions. A Target in the access control policy is used to match annotated targets obtained from the natural language analysis of the document accompanying the service (see FIG. 12 and FIG. 13).

An Effect in the access control policy is the access control details for the computer when a Target in the access control policy matches an annotated target. The access control details are measures used by the user or developer establishing the access control policy to control access to the service from the perspective of security, corporate or governmental compliance, or protection of personal information. Access control details include "display warning" shown in FIG. 14 below, "stop installation" shown in FIG. 15 below, and "access denied" shown in the upper level of FIG. 16 below. These may also include other measures (disabling the accept or agree button, or forcibly closing an active page or active window). The access control details may also be a combination of "access denied" shown in the upper level of FIG. 16 and "access permitted" shown in the lower level of FIG. 16. In addition, the access control details may control access to information in the possession of the user (such as an address book).

Conditions in the access control policy are preconditions that should be considered beforehand in addition to determining whether a Target in the access control policy matches an annotated target. Conditions include triggers for determining whether or not to control access, access control time periods, priorities in the access control policy, and not controlling access when personal information has already been divulged to others and other users have already been granted permission.

The control access policy can be implemented using OASIS eXtensible Access Control Markup Language (XACML) TC (see Non-patent Literature 4).

In Block 307, the computer (101) determines whether or not the item defined in the access control policy that was retrieved in Block 306 is found in the document accompanying the service. More specifically, the computer (101) determines whether the Subjects, Resources and Actions in the access control policy retrieved in Block 306 match the annotated target outputted in Block 329. When there is a match, the computer (101) advances the process to Block 308. When there is no match, the computer (101) returns the process to Block 302.

In Block 308, the computer (101), in response to a match, references the access control policy and controls access to the service. The computer (101), in response to a match, controls access to the service in accordance with the access control details defined in the Effect of the access control policy. Alternatively, the computer (101), in response to a match, controls access to the service by executing an access control detail program specified in the Effect of the access control policy.

In Block 309, the computer (101) determines whether or not the termination conditions have been satisfied. When the termination conditions have been satisfied, the computer (101) advances the process to the termination operation (311). When the termination conditions have not been satisfied, the computer (101) returns the process to Block 302.

In Block 310, when the computer (101) has not detected a document accompanying the service at any search location, it may perform operations including, but not limited to, the following:

the computer (101) prompts the user to enter the document accompanying the service, such as directly entering the document accompanying the service into an input site (such as an input window);

the computer (101) prompts the user to enter the document accompanying the service, such as cutting and pasting the document accompanying the service from the storage site to the input site (such as an input window);

the computer (101) forces the user receiving the service to choose whether or not to use the service;

the computer (101) displays on the display device (106) that the document accompanying the service has not been found or that access control has not been determined because the document cannot be obtained;

the computer (101) forcibly terminates the installation operation in the case of a software installing service; or the computer (101) acquires the install log and sends it to an administrator via email in the case of a software installing service.

In Block 311, the computer (101) ends the process of controlling access to the service in accordance with an embodiment of the claimed subject matter.

The flowchart in FIG. 6 includes a block (328) in which the natural language analysis mechanism (904) determines whether the terms annotated in Block 325 have a predetermined relationship, and a block (329) in which the natural language analysis mechanism (904) groups terms with a predetermined relationship (the same attribute value in the annotation dictionary) as an annotated target. Alternatively, the natural language analysis mechanism (904) annotates matching terms in Block 325 without determining whether or not the annotated terms have a predetermined relationship, and the process advances via the processing in Block 327 to the termination process in Block 330. In this alternative method, the natural language processing mechanism (904) may determine in Block 307 whether an item defined in the access control policy has a term that was annotated in Block 325. In other words, in this alternative method, the natural language analysis mechanism (904) may determine on the word level whether an item defined in the access control policy is a term that was annotated in Block 325. Therefore, in this alternative method, the natural language analysis mechanism (904) can control access to a service when a given word (it may be a single word) matches an item defined in the access control policy.

The flowchart in FIG. 6 includes a Block (324) in which the natural language analysis mechanism (904) receives the results of natural language analysis and determines whether or not the terms in the document match an attribute in the annotation dictionary, a Block (325) in which a matching term is assigned the annotation associated with the matching attribute value, and a Block (328) in which the natural language analysis mechanism (904) determines whether or not there is a predetermined relationship between terms annotated in Block 325. Alternatively, the natural language analyzing mechanism (904) may receive the results of the natural language analysis, determine whether or not terms in the document match the attributes of the annotation dictionary (Block 324), determine whether or not there is a predetermined relationship between matching terms, and annotate terms with a predetermined relationship.

FIG. 7 shows an example in which a document accompanying a service (web service) is sought and acquired in accordance with an embodiment of the claimed subject matter (see Blocks 302 through 304 in FIG. 5). The user enters a URL (http://www.abc.co.jp/) in the web browser displayed on the computer (401). The web browser on the computer (401) then jumps from one URL (http://www.123.co.jp/) to the entered URL ((http://www.abc-.co.jp/). When a page (412) of the entered URL (http://www.abc.co.jp/) is displayed, the computer (401) searches the page (412) or, if necessary, a page linked to the page (412) for a document accompanying the web service. The computer (401) finds a title linked to a document such as Terms of Use and Privacy Policy in the home page of the entered URL (http://www.abc.co.jp/). The computer (401) acquires (downloads) each document, such as Terms of Use and Privacy Policy, from each link, and stores the documents in the memory (103) of the computer (401) or in a storage device (108).

Figure 8:
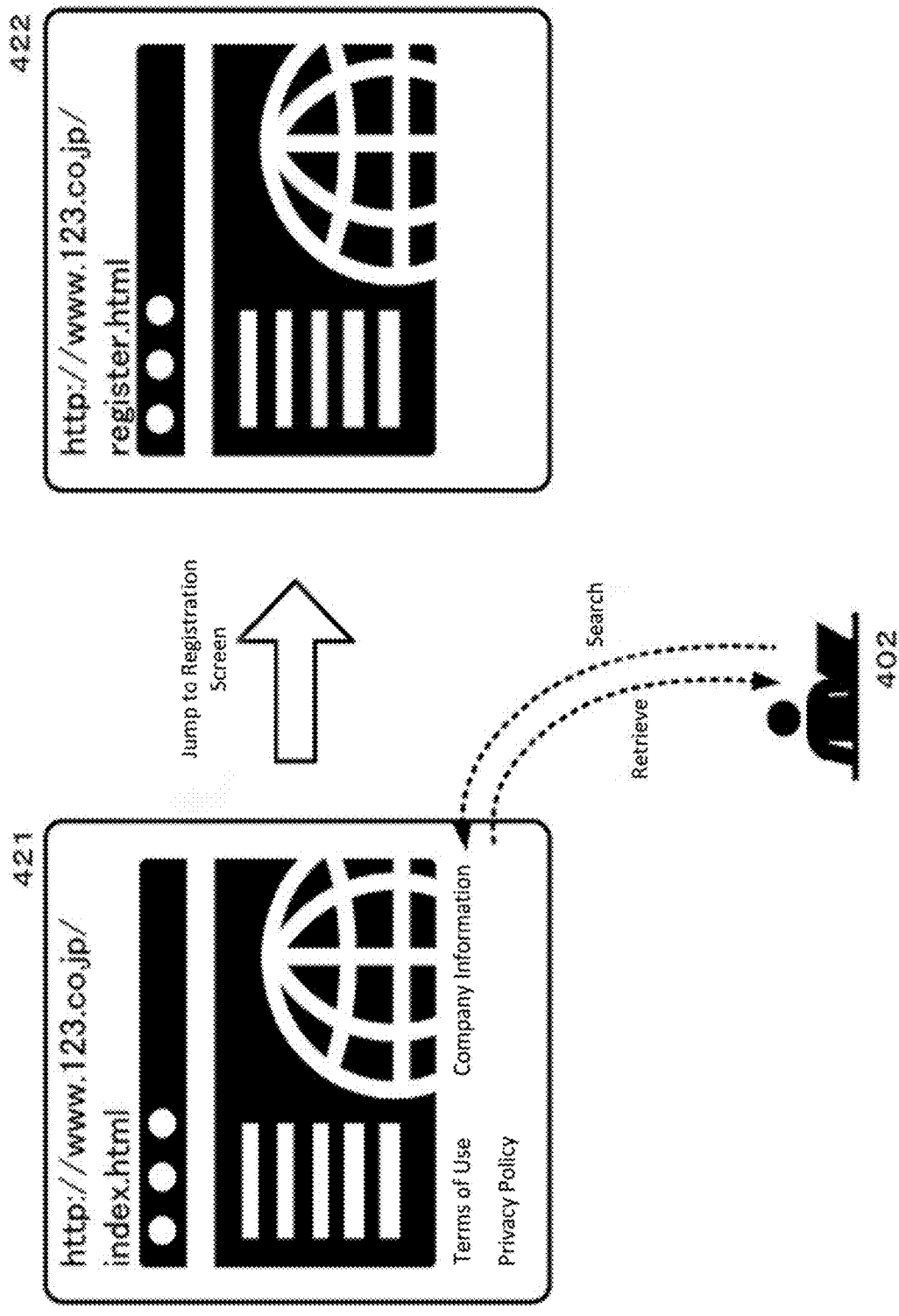
FIG. 8 shows an example of a document accompanying a service (web service) being sought and acquired in accordance with an embodiment of the claimed subject matter.

FIG. 8 shows an example in which a document accompanying a service (web service) is sought and acquired in accordance with an embodiment of the claimed subject matter (see Blocks 302 through 304 in FIG. 5). The user enters a URL (http://www.123.co.jp/) into the web browser displayed on the computer (402), and clicks on "enter" on the home page (421) of the URL (http://www.123.co.jp/index.html) to begin the registration process to use the web service. The web browser on the computer (402) then jumps to page (422) of the URL (http://www.123.co.jp/register.html), and displays the page (422) after the jump. When the computer (402) is displaying the page (422), the computer (402) searches for a document accompanying the web service on the page (422) after the jump, the page (421) prior to the jump if necessary, a page linked to the page (421) prior to the jump, and/or a page linked to the page (422) after the jump. The computer (402) finds titles of links to documents such as "Terms of Use" and "Privacy Policy" on the home page (421) of the URL, prior to the jump. The computer (402) then acquires (downloads) each document from each link, such as "Conditions of Use" and "Handling Privacy", and stores them in the memory (103) in the computer (402) or in a storage device (108).

Figure 9:
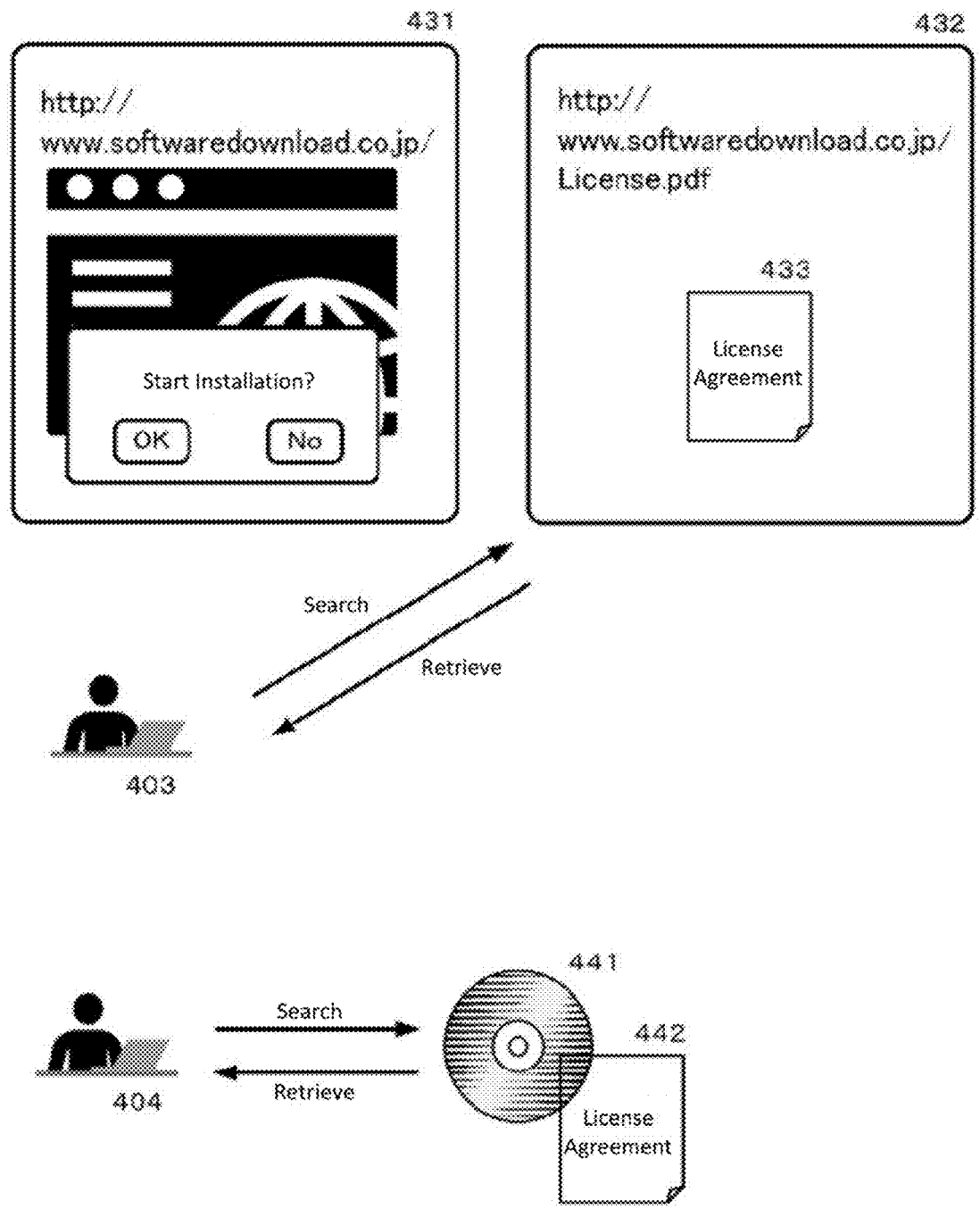
FIG. 9 shows an example of a document accompanying a service (software installation) being sought and acquired in accordance with an embodiment of the claimed subject matter.

FIG. 9 shows an example in which a document accompanying a service (software installation service) is sought and acquired in accordance with an embodiment of the claimed subject matter (see Blocks 302 through 304 in FIG. 5). In the example shown at the top of FIG. 9, the user downloads software from the URL (http://www.software-download.co.jp/) on the web browser displayed on the computer (403) and begins the installation process. In response to the start of the installation process, the computer (403) searches for any document accompanying the web service on the page (431) of the URL (http://www.software-download.co.jp/) or, if necessary, on a page linked to the page (431). The computer (403) finds a document entitled "License.pdf" in the same directory as the page (431). The computer (403) may acquire (downloads) the document entitled "License.pdf", and store it in the memory (103) of the computer (403) or in a storage device (108).

In the example shown at the bottom of FIG. 9, the user inserts a DVD-ROM (441) into a DVD drive connected to the computer (404), and begins to install the software stored on the DVD-ROM (441) on the computer (404). The computer (404) retrieves the software install execution file on the DVD-ROM (441), and begins the installation process. When the installation process has begun, the computer (404) searches for any document accompanying the software on the DVD-ROM (441) or, if necessary, on a page linked to a file stored in the DVD-ROM (441) (such as an internet link). The computer (404) finds a document entitled "readme.txt" on the DVD-ROM (441). The computer (404) may acquire (retrieves from the DVD-ROM) the document entitled "readmebeforeusing.txt", and store it in the memory (103) of the computer (404) or in a storage device (108).

Figure 10:
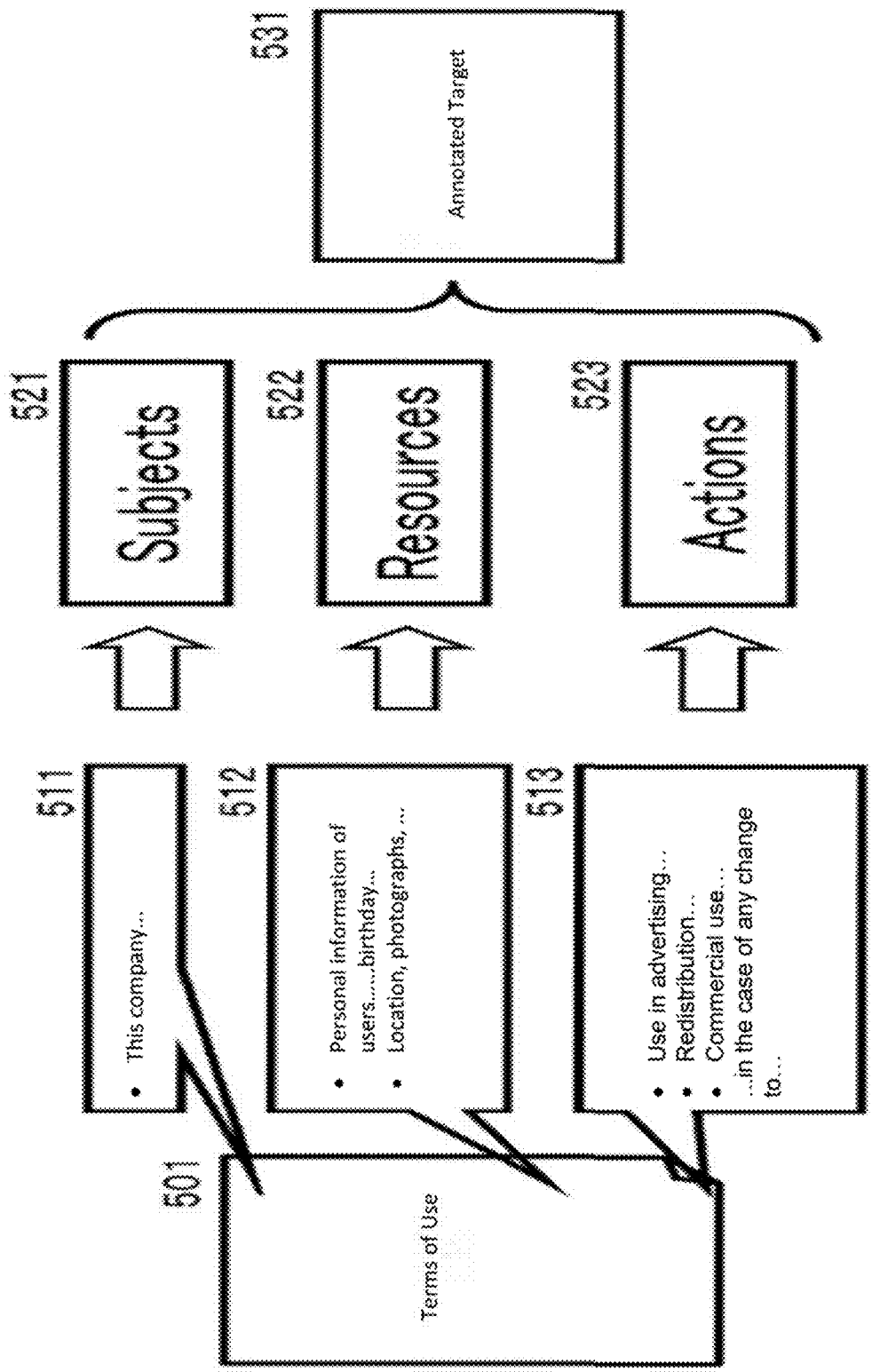
FIG. 10 shows an example of a natural language analysis performed on a document (Conditions of Use) associated with a service and the annotation of terms in the results of the natural language analysis in accordance with an embodiment of the claimed subject matter.

FIG. 10 shows an example in which natural language analysis is performed on a document accompanying a service, and a term resulting from the natural language analysis is annotated in accordance with an embodiment of the claimed subject matter (see Block 305 in FIG. 5). In FIG. 10, the document accompanying the service is Conditions of Use (501). The computer (101) uses the natural language analysis mechanism to perform natural language analysis on the Conditions of Use (501). FIG. 10 shows some of the results from the natural language analysis (511, 513, and 513).

The natural language analysis mechanism (904) determines whether any of the terms in the document resulting from the natural language analysis match any of the attribute values in the annotation dictionary. When a term in the document matches an attribute value in the annotation dictionary, the natural language analysis mechanism (904) assigns to the term the annotation associated with the matching attribute value. In other words, in the embodiment of the claimed subject matter, the annotation Subjects (521), Resources (522) or Actions (523) is assigned.

In the example in FIG. 10, the natural language analysis mechanism (904) assigns the annotation Subjects (521) to the term "this company", the annotation Resources (522) to the terms "personal information of the user", "birthday", "location" and "photograph", and assigns the annotation Actions (523) to the terms "use in advertising", "redistribution", "commercial use" and "modification".

The natural language analysis mechanism (904) groups the annotated terms with a predetermined relationship as an annotated target (531).

Figure 11:
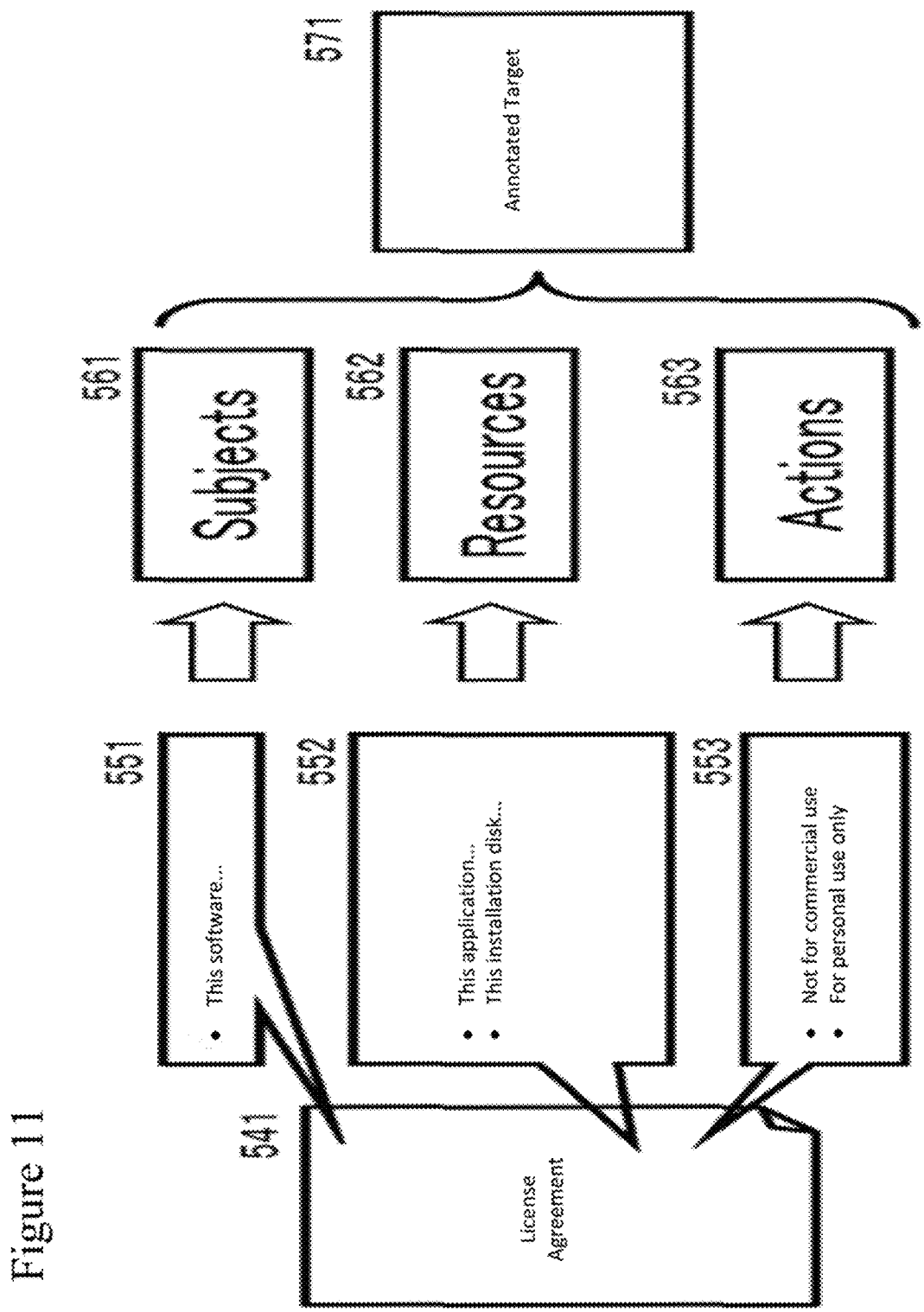
FIG. 11 shows an example of a natural language analysis performed on a document (License Agreement) associated with a service and the annotation of terms in the results of the natural language analysis in accordance with an embodiment of the claimed subject matter.

FIG. 11 shows an example in which natural language analysis is performed on the documents accompanying the service, and annotates the terms resulting from the natural language analysis in accordance with an embodiment of the claimed subject matter (see Block 305 in FIG. 5). In FIG. 11, the document accompanying the service is an End User License Agreement (541). The computer (101) uses the natural language analysis mechanism to perform natural language analysis on the End User License Agreement (541). FIG. 11 shows some of the results of this natural language analysis (551, 552, and 553).

The natural language analysis mechanism (904) determines whether any of the terms in the document resulting from the natural language analysis match any of the attribute values in the annotation dictionary. When a term in the document matches an attribute value in the annotation dictionary, the natural language analysis mechanism (904) assigns to the term the annotation associated with the matching attribute value. In other words, in the embodiment of the claimed subject matter, the annotation Subjects (561), Resources (562) or Actions (563) is assigned.

In the example in FIG. 11, the natural language analysis mechanism (904) assigns the annotation Subjects (561) to the term "user", assigns the annotation "Resources" (562) to the terms "this software" and "this installation disk", and assigns the annotation "Actions" (563) to the terms "not for commercial use" and "personal use only".

The natural language analysis mechanism (904) groups the annotated terms with a predetermined relationship as an annotated target (571).

FIG. 12 shows an annotation dictionary that may be used by the natural language analysis mechanism to annotate terms in accordance with an embodiment of the claimed subject matter. The annotation dictionary (601) is for a web service, and the document accompanying the web service is Conditions of Use. The annotation dictionary (601) has attribute names and attribute values. The annotation dictionary (601) has, as annotations, Subjects (611), Resources (612) and Actions (613).

The natural language analysis mechanism (904) assigns the annotation Subjects (611) to the attribute value "this company" when the term "this company" is included among the results of the natural language analysis performed on the Conditions of Use accompanying the web service. Similarly, the natural language analysis mechanism (904) assigns the annotation "Resources" (612) to the attribute values "personal information of the user", "birthday", and "photograph", and assigns the annotation "Actions" (613) to the attribute value "use in advertising".

When there are at least two annotated terms with a predetermined relationship, the natural language analysis mechanism (904) groups the terms with the predetermined relationship (with the same attribute value in the annotation dictionary) as an annotated target. An example of an annotated target is [(Subjects, company), (Resources, personal information of the user), (Actions, use in advertising)].

Alternatively, the natural language analysis mechanism (904) groups an attribute name associated with terms having a predetermined relationship (the same attribute value in the annotation dictionary) as an annotated target. An example of an annotated target is [(Subjects, service provider), (Resources, personal information), (Actions, use in advertising)].

The examples from the annotation dictionary (601) shown in FIG. 12 are attribute names which are expressions that generalize or more broadly conceptualize attribute values. Alternatively, the attribute names can be expressions in the form of a formula.

FIG. 13 shows an annotation dictionary that may be used by the natural language analysis mechanism to annotate terms in accordance with an embodiment of the claimed subject matter. The annotation dictionary (621) is for a software installation service, and the document accompanying the web service is an End User License Agreement. The annotation dictionary (621) has attribute names and attribute values. The annotation dictionary (621) has, as annotations, Subjects (631), Resources (632) and Actions (633).

The natural language analysis mechanism (904) assigns the annotation Subjects to the attribute value "user" when the term "user" is included among the results of the natural language analysis performed on the End User License Agreement accompanying the software installation service. Similarly, the natural language analysis mechanism (904) assigns the annotation "Resources" (632) to the attribute values "this software", "this application", and "this installation disk", and assigns the annotation "Actions" (633) to the attribute value "not for commercial use".

When there are at least two annotated terms with a predetermined relationship, the natural language analysis mechanism (904) groups the terms with the predetermined relationship (with the same attribute value in the annotation dictionary) as an annotated target. An example of an annotated target is [(Subjects, user), (Resources, this software), (Actions, not for commercial use)].

Alternatively, the natural language analysis mechanism (904) groups an attribute name associated with terms having a predetermined relationship (the same attribute value in the annotation dictionary) as an annotated target. An example of an annotated target is [(Subjects, user), (Resources, software), (Actions, not for commercial use)].

The examples from the annotation dictionary (621) shown in FIG. 13 are attribute names which are expressions that generalize or more broadly conceptualize attribute values. Alternatively, the attribute names can be expressions in the form of a formula. For example, the attribute name associated with an action can be "NOT (for commercial use, published on the internet)".

FIG. 14 shows an example of an access control policy that may be used by the computer in an embodiment of the claimed subject matter. The access control policy (701) shown in FIG. 14 is for a web service, and is defined from the standpoint of those who do not want personal information used for advertising. In the embodiment of the claimed subject matter, the access control policy (701) has a Target (711), an Effect (712), and Conditions (713).

FIG. 15 shows an example of an access control policy that may be used by the computer in an embodiment of the claimed subject matter. The access control policy (721) shown in FIG. 15 is for a software installation service, and is defined from the standpoint of preventing installation of software (for example, open source software) with licensing that does not match the intended purpose of the user, and preventing misuse from lack of understanding of the License Agreement. In the embodiment of the claimed subject matter, the access control policy (721) has a Target (731), an Effect (732), and Conditions (733).

FIG. 16 shows an example of an access control policy that may be used by the computer in an embodiment of the claimed subject matter. The two access control policies (741, 761) shown in FIG. 16 are for a software installation service. In the embodiment of the claimed subject matter, the access control policies (741, 761) have Targets (751, 771). Effects (752, 772), and Conditions (753, 773).

In the access control policy (741) shown in FIG. 16, the Effect is a rule preventing access of the entire software, and the Conditions apply a priority status of 2 to Software A. In the access control policy (761) shown in FIG. 16, the Effect is a rule allowing access to specific software only for a particular use, and the Conditions apply a priority status of 1 to Software A. Because Software A is given higher priority in access control policy (761) than in access control policy (741), the computer (101) can perform access control to permit access to Software A using access control policy (761) after denying access to the entire software using access control policy (741).

FIG. 17 shows an example of the computer referencing an access control policy to control access to a service. In FIG. 17, the service is a web service.

The computer (101) receives a web service start request from the user (during registration). In response to receiving a web service start request, the computer (101) downloads the Conditions of Use (801) accompanying the web service, and stores them in the memory (103).

The computer (101) performs natural language analysis on the downloaded Conditions of Use (801). The computer (101) verifies that "this company", "personal information of the user", and "used for advertising" in the results of the natural language analysis match various attributes in the annotation dictionary (601). The computer (101) references the annotation dictionary (601) and converts the matching attribute values "this company", "personal information of the user", and "used for advertising" to the attribute names associated with the attribute values, namely, "service provider" (811), "personal information" (812) and "use in advertising" (813). The computer (101) references the annotation dictionary (601), and assigns the annotations Subjects (821), Resources (822) and Actions (823), respectively, to "service provider" (811), "personal information" (812) and "use in advertising" (813). The computer (101) then determines that there is a predetermined relationship between these three attribute names because the attribute name "service provider" assigned the annotation Subjects and the attribute name "personal information" assigned the annotation Resources are linked to the attribute name "use in advertising" assigned the annotation Actions. The computer (101) groups the attribute name "service provider" assigned the annotation Subjects, the attribute name "personal information" assigned the annotation Resources, and the attribute name "use in advertising" as an annotated target. The computer (101) matches the annotated target with each item (Subjects, Resources, Actions) in the access control policy (701). As a result of the matching process, the computer (101) determines that the annotated target [(Subjects, service provider), (Resources, personal information), (Actions, use in advertising)] matches each item (Subject, Resources. Actions) of the Target in the access control policy (701), and determines that the user registering the web service satisfies the Conditions (preconditions) in the access user policy (701). Because all of the items defined in the access control policy (701) have been satisfied, the computer (101) displays a warning message on the user's display device in accordance with the access control details (display warning) defined in Effect in the access control policy (701) which states that personal information will be used for advertising.

FIG. 18 shows an example of the computer referencing an access control policy to control access to a service. In FIG. 18, the service is a software installation service.

The computer (101) receives a software installation start request from the user. In response to receiving a software installation start request, the computer (101) downloads the End User License Agreement (841) accompanying the installation of software, and stores it in the memory (103).

The computer (101) performs natural language analysis on the acquired End User License Agreement (841). The computer (101) verifies that "user", "this software", and "not for commercial use" in the results of the natural language analysis match various attributes in the annotation dictionary (621). The computer (101) references the annotation dictionary (621) and converts the matching attribute values "user", "this software", and "not for commercial use" to the attribute names associated with the attribute values, namely, "user" (851), "software" (852) and "not for commercial use" (853). The computer (101) references the annotation dictionary (621), and assigns the annotations Subjects (861), Resources (862) and Actions (863), respectively, to "user" (851), "software" (852) and "not for commercial use" (853). The computer (101) then determines that there is a predetermined relationship between these three attribute names because the attribute name "user" assigned the annotation Subjects and the attribute name "software" assigned the annotation Resources are linked to the attribute name "not for commercial use" assigned the annotation Actions. The computer (101) groups the attribute name "user" assigned the annotation Subjects, the attribute name "software" assigned the annotation Resources, and the attribute name "not for commercial use" as an annotated target. The computer (101) matches the annotated target with each item (Subjects, Resources, Actions) in the access control policy (721). As a result of the matching process, the computer (101) determines that the annotated target [(Subjects, user), (Resources, software), (Actions, not for commercial use)] matches each item (Subject, Resources. Actions) of the Target in the access control policy (721), and determines that the user installing the software satisfies the Conditions (preconditions) in the access control policy (721). Because all of the items defined in the access control policy (721) have been satisfied, the computer (101) forcibly stops installation of the software being installed by the user in accordance with the access control details (stop installation) defined in Effect in the access control policy (721).

FIG. 19 is a function block diagram of a computer (101) preferably including the hardware configuration of the computer in FIG. 1 which is used to control access to a service in accordance with an embodiment of the claimed subject matter.

The computer (101) includes an access control policy managing mechanism (901), a monitoring and controlling agent mechanism (902), a document verifying mechanism (903), and a natural language analysis mechanism (904).

The user (911) wishes to use the service (912).

The access control policy managing mechanism (901) receives the registration of one or more access control policies from the user or administrator (911). The user or administrator (911) may establish the requirements for each item (Subjects, Resources, Actions, Effect, Condition) defined in the access control policy from the standpoint of protecting personal information, ensuring compliance at a corporation or governmental organization, and providing security. The access control policy managing mechanism (901) may display the requirements for each item in menu format for the user to select.

The access control policy managing mechanism (901) may send the registered access control policy or policies to the monitoring and controlling agent mechanism (902) in response to a request from the monitoring and controlling agent mechanism (902) (see Block 306 in FIG. 5).

The monitoring and controlling agent mechanism (902) may request that the access control policy managing mechanism (901) send it the access control policy or policies. The monitoring and controlling agent mechanism (902) acquires the access control policy or policies from the access control policy managing mechanism (901) in response (see Block 306 in FIG. 5), and store the policy or policies in the memory (103) or storage device (108).

The monitoring and controlling agent mechanism (902) receives a service start request (see Block 302 in FIG. 5), searches for a document accompanying the service in the computer or drive (109) connected to the computer associated with the administrator (911), or may search the computer (912) providing the service for the document accompanying the service or may request the document from the computer (see Block 303 in FIG. 5). The monitoring and controlling agent mechanism (902) may acquire the document accompanying the service from the computer (101) or drive (109) connected to the computer (101) associated with the user or administrator (911), or may acquire the document from the computer (912) providing the service (see Block 304 in FIG. 5). The monitoring and controlling agent mechanism (902) may send the acquired document accompanying the service and the access control policy to the document verifying mechanism (903).

The document verifying mechanism (903) sends the document received from the monitoring and controlling agent mechanism (902) to the natural language analysis mechanism (904).

The natural language analysis mechanism (904) receives the document sent by the document verifying mechanism (903), and performs natural language analysis on the document (see Block 305 in FIG. 5 and Block 322 in FIG. 6). The natural language analysis mechanism (904) annotates any term resulting from the analysis which has an attribute value in the annotation dictionary (see Block 323 through Block 325 in FIG. 6). When there is a predetermined relationship between annotated terms, the natural language analysis mechanism (904) groups the terms with the predetermined relationship (having the same attribute value in the annotation dictionary) as an annotated target (see Blocks 328 through 329 in FIG. 6). The natural language analysis mechanism (904) sends the annotated target to the document verifying mechanism (903). The natural language analysis mechanism (904) will be explained in greater detail with reference to FIG. 20 below.

The document verifying mechanism (903) determines whether the Subjects, Resources and Actions in the access control policy match the annotated target sent from the natural language analysis mechanism (904) (see Block 307 in FIG. 5). When there is a match, the document verifying mechanism (903) sends a request to the monitoring and controlling agent mechanism (902), asking the monitoring and controlling agent mechanism (902) to enforce the action control details defined in the results of the action control policy.

The monitoring and controlling agent mechanism (902) controls access to the service in accordance with the action control details defined in the results of the access control policy (see Block 308 in FIG. 5).

The monitoring and controlling agent mechanism (902) may include the acquiring functions, control functions, receiving functions and searching functions described in the claims and the specification. The document verifying mechanism (903) may also include the functions of the determining means described in the claims and in the specification. The natural language analysis mechanism (904) may include the functions of the analyzing means and annotating means described in the claims and the specification.

Figure 20:
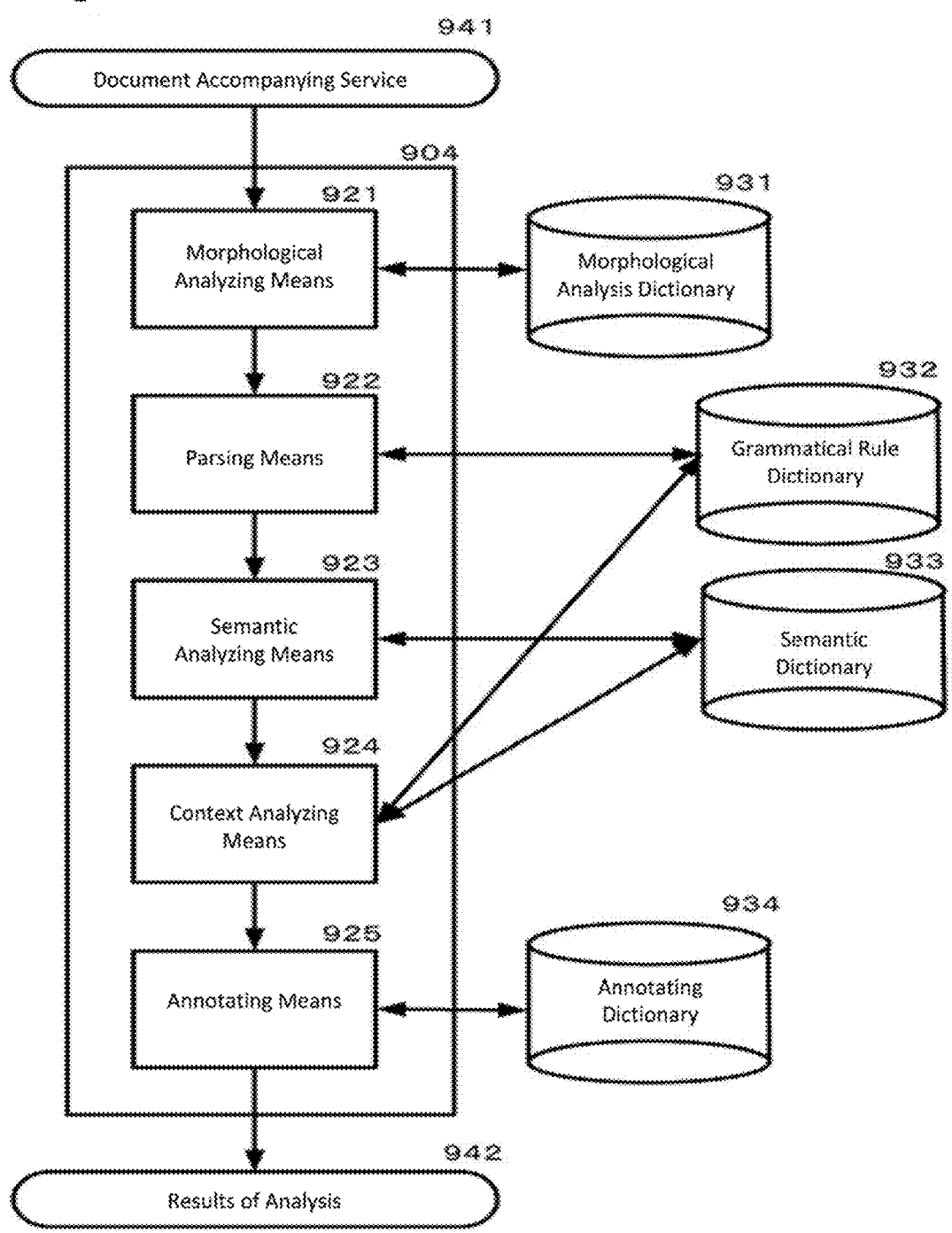
FIG. 20 is a function block diagram of the natural language analysis mechanism shown in FIG. 19.

FIG. 20 is a function block diagram of the natural language analysis mechanism (904) shown in FIG. 19. The natural language analysis mechanism (904) includes a morphological analyzing means (921) and an annotating means (925). The natural language analysis mechanism (904) may also include a parsing means (922), a semantic analyzing means (923), and a context analyzing means (924). The morphological analyzing means (921), parsing means (922), semantic analyzing means (923), and context analyzing means (924) can use any technique common in the art.

The morphological analyzing means (921) uses a morphological analysis dictionary (931) to divide the document accompanying the service used in the embodiment of the claimed subject matter into morphemes, which are the smallest unit of meaning in language. The morphological analyzing means (921) may use different morphological analysis engines depending on the language (for example, Japanese or English). The morphological analysis engine for Japanese may be any engine available as a free license, such as ALTJAWS, Breakfast, KAKASI (kanji kana simple inverter). Mecab, ChaSen. Juman, Sen, NMeCab, Igo (Java (registered trademark) morphological analyzer), KyTea (the Kyoto Text Analysis Toolkit) or Sumomo. It may also be a commercially available engine such as the Rosette morphological analysis system, the Gengoro morphological analysis engine, or the Marimo morphological analysis system. Examples of English-language morphological analysis engines include Brill's Tagger, TreeTagger, Charniak Parser and GENIA Tagger. Any morphological analysis engine common in the art can be used. The morphological analysis dictionary (931) includes knowledge of the grammar of the target language (a collection of rules of grammar) and a dictionary (list of words including information on parts of speech, etc.) as information sources. An example of a morphological analysis dictionary is Unidic. Any morphological analysis dictionary common in the art can be used.

The parsing means (922) uses a grammatical rule dictionary (932) to determine the positional relationship between all of the words constituting a sentence (for example, the information dependency of words). The parsing means (922) performs the parsing using sentences. The parsing means (922) may express the positional relationship between words using a hierarchical tree diagram (also referred to as a syntax tree). Examples of parsing means include KNP and CaboCha. Any parsing means common in the art can be used.

The following is a list of information dependencies of words:
1. That which relates a noun term to a possessive term, or that which relates a noun term to a noun term in the possessive case (for example, (possessive case) Noun B of Noun A).
2. That which relates a noun term directly to a verb term, or that which relates to a noun term as the object of a verb term (for example, Noun P, Noun Q, Noun R, etc.→Verb X (directly dependent on Verb X).
3. That which relates a noun to a verb term as a direct object, or that which is related to a noun term as a direct object of a verb term (for example, Noun K to (direct object) Verb).

Semantic analyzing means (923) uses a semantic dictionary (933) to select a syntax tree. A semantic dictionary (933) is also a concept dictionary in which typical conceptual relationships are defined. Examples of semantic analyzing means include AYA and SAGE. Any semantic analyzing means common in the art may be used.

The context analyzing means (924) uses the grammatical rule dictionary (932) and the semantic dictionary (933) to create a syntax tree that spans more than one sentence and perform a semantic analysis. This is different from the parsing means (922), which performs parsing in sentence units.

The annotating means (925) responds to any match between a term in the document accompanying the service and an attribute value in the annotation dictionary by annotating the term using an annotation associated with the matching attribute value. These annotations are Subjects, Resources, or Actions (see Block 325 in FIG. 5).

We claim:

1. An apparatus for controlling access to a service provided by a server device using computer processing, the method comprising:
    a processor coupled to a client computing device requesting a service from a server computing device supplying the service;
    a non-transitory computer-readable recording medium coupled to the processor; and
    logic, stored on the computer-readable recording medium and executed on the processor, for:
        acquiring, by the client computing device, a document provided by the server computing device, wherein the document comprises terms of service associated with the service;
        performing, by the client computing device, natural language analysis on the acquired document, the natural language processing comprising:
            annotating a term in the document with a attribute value; and
            matching the attribute value with an attribute value of an access control policy:
        determining, by the client computing device, from the results of the natural language analysis that an item defined in the access control policy is in the acquired document; and
        refusing access by the client computing device to the service on the server computing device in response to the determining.

2. The apparatus of claim 1, wherein the logic for determining further comprises logic for adding a subject, resource or action annotation to a term in response to the results of natural language analysis having a term associated with the access control policy.

3. The apparatus of claim 2, wherein the logic for determining further comprises logic for matching a term having a predetermined relationship to an item defined in the access control policy in response to at least two terms with a subject, resource or action annotation having the predetermined relationship.

4. The apparatus of claim 3, wherein the predetermined relationship includes at least two terms with a subject, resource or action annotation in the same item of the document.

5. The apparatus of claim 3, wherein the predetermined relationship links at least one of a term having a subject annotation and a term having a resource annotation to a term having an action annotation in one sentence of the document.

6. A computer programming product for controlling access to a service using computer processing, the computer programming product comprising:
    a non-transitory computer-readable recording medium; and
    logic, stored on the computer-readable recording medium for execution on a processor coupled to a client computing device requesting a service from a server computing device supplying the service, for:
        acquiring, by the client computing device, a document provided by the server computing device, wherein the document comprises terms of service associated with the service;
        performing, by the client computing device, natural language analysis on the acquired document, the natural language processing comprising:
            annotating a term in the document with an attribute value; and
            matching the attribute value with an attribute value of an access control policy;
        determining, by the client computing device, from the results of the natural language analysis that an item defined in the access control policy is in the acquired document; and
        refusing access by the client computing device to the service on the computing device in response to the determining.

7. The computer programming product of claim 6, wherein the logic for determining further comprises logic for adding a subject, resource or action annotation to a term in response to the results of natural language analysis having a term associated with the access control policy.

8. The computer programming product of claim 7, wherein the logic for determining further comprises logic for matching a term having a predetermined relationship to an item defined in the access control policy in response to at least two terms with a subject, resource or action annotation having the predetermined relationship.

9. The computer programming product of claim 8, wherein the predetermined relationship includes at least two terms with a subject, resource or action annotation in the same item of the document.

* * * * *